(12) United States Patent  
Gai et al.

(10) Patent No.: US 12,411,960 B2
(45) Date of Patent: Sep. 9, 2025

(54) DYNAMIC ENCRYPTION/DECRYPTION OF GENOMIC INFORMATION

(71) Applicants: Children's Hospital Los Angeles, Los Angeles, CA (US); University of Southern California, Los Angeles, CA (US)

(72) Inventors: Xiaowu Gai, La Canada-Flintridge, CA (US); Alex Ryutov, Playa Vista, CA (US); Tatyana Ryutov, Playa Vista, CA (US)

(73) Assignees: Children's Hospital Los Angeles, Los Angeles, CA (US); University of Southern California, Los Angeles, CA (US)

( * ) Notice: Subject to any disclaimer, the term of this patent is extended or adjusted under 35 U.S.C. 154(b) by 253 days.

(21) Appl. No.: 17/617,906

(22) PCT Filed: Jun. 10, 2020

(86) PCT No.: PCT/US2020/037033
§ 371 (c)(1),
(2) Date: Dec. 9, 2021

(87) PCT Pub. No.: WO2020/252050
PCT Pub. Date: Dec. 17, 2020

(65) Prior Publication Data
US 2023/0094541 A1 Mar. 30, 2023

Related U.S. Application Data

(60) Provisional application No. 62/859,575, filed on Jun. 10, 2019.

(51) Int. Cl.
*G06F 21/60* (2013.01)
*G06F 16/13* (2019.01)

(52) U.S. Cl.
CPC ............ *G06F 21/602* (2013.01); *G06F 16/13* (2019.01)

(58) Field of Classification Search
None
See application file for complete search history.

(56) References Cited

U.S. PATENT DOCUMENTS 8,621,036 B1 * 12/2013 L'Heureux ............. G06F 21/62
726/28
9,037,870 B1 * 5/2015 Zheng ................... H04L 9/0891
380/42

(Continued)

FOREIGN PATENT DOCUMENTS

WO WO 2018/170963 9/2018

OTHER PUBLICATIONS

International Application No. PCT/US20/37033, International Search Report, 2 pages, Sep. 18, 2020.

(Continued)

*Primary Examiner* — Bassam A Noaman
(74) *Attorney, Agent, or Firm* — Klarquist Sparkman, LLP

(57) ABSTRACT

Examples are described for dynamically encrypting and/or decrypting a file formed of multiple blocks of ordered data. In one example, a method of dynamically encrypting a file to enable partial decryption of the file includes generating, using a secret key and one or more initialization vectors, a keystream for the multiple blocks of ordered data, encrypting the multiple blocks of ordered data of the file by performing a logical operation of the keystream with the multiple blocks of ordered data in a one-to-one correspondence, and building a file index of the file to identify location information of the multiple blocks of ordered data. The method may further include dynamically decrypting at least a portion of the file by decrypting at least one selected block (Continued)

of encrypted data of the file using a portion of the keystream, the portion of the keystream corresponding to the at least one selected block.

19 Claims, 10 Drawing Sheets

Specification includes a Sequence Listing.

(56) References Cited

U.S. PATENT DOCUMENTS

| | | | |
|---|---|---|---|
| 2003/0081790 A1* | 5/2003 | Kallahalla | H04L 9/088 380/281 |
| 2007/0116277 A1* | 5/2007 | Ro | H04N 19/70 375/E7.199 |
| 2009/0196427 A1* | 8/2009 | Krishnapuram | H04K 1/00 380/287 |
| 2012/0054500 A1* | 3/2012 | Dhuse | G06F 21/6218 713/189 |
| 2014/0032924 A1* | 1/2014 | Durham | G06F 21/32 713/186 |
| 2014/0289513 A1* | 9/2014 | Huang | H04L 9/3073 713/160 |
| 2015/0379295 A1 | 12/2015 | Branton et al. | |
| 2016/0275308 A1 | 9/2016 | Hubaux et al. | |
| 2018/0276409 A1 | 9/2018 | Hubaux et al. | |
| 2018/0287789 A1* | 10/2018 | Sridharan | H04L 63/0428 |
| 2019/0171841 A1* | 6/2019 | Steinfeld | G06F 21/629 |
| 2019/0278916 A1* | 9/2019 | Lum | G06F 21/6218 |
| 2020/0111200 A1* | 4/2020 | Li | G06N 3/08 |
| 2021/0288789 A1* | 9/2021 | Chen | H04L 9/0869 |

OTHER PUBLICATIONS

International Application No. PCT/US20/37033, Written Opinion, 7 pages, Sep. 18, 2020.
Extended European Search Report, European Application No. 20821937.8, mailed Jun. 14, 2023, 11 pages.
Huang et al., "A Privacy-Preserving Solution for Compressed Storage and Selective Retrieval of Genomic Data," *Genome Research*, genome.cship.org, vol. 26, No. 12, Oct. 27, 2016, pp. 1687-1696.
Namazi et al., "Dynamic Attribute-Based Privacy-Preserving Genomic Susceptibility Testing," *Designing Interactive Systems Conference, ACM*, Apr. 8, 2019, pp. 1467-1474.
Raisaro, "Privacy-Enhancing Technologies for Medical and Genomic Data: From Theory to Practice," https://infoscience.epfl.ch/record/254876/EPFL_TH8307.pdf, Apr. 13, 2018 (accessed Jul. 3, 2018).
Office Action (w/translation) received in Israel Application No. 288831, dated Dec. 31, 2023, 6 pages.
Office Action received in Canadian Application No. 3,141,078, dated Jan. 11, 2024, 5 pages.
Office Action, Canadian Application No. 3,141,078, 6 pages, May 12, 2025.

* cited by examiner

DYNAMIC ENCRYPTION/DECRYPTION OF GENOMIC INFORMATION

CROSS REFERENCE TO RELATED APPLICATIONS

This application is the U.S. National Stage of International Application No. PCT/US2020/037033, filed Jun. 10, 2020, which was published in English under PCT Article 21(2), which in turn claims the benefit of U.S. Provisional Application No. 62/859,575, filed Jun. 10, 2019, which is herein incorporated by reference in its entirety.

BACKGROUND

The advent of next-generation sequencing (NGS) technologies led to the emergence of genomic medicine, which uses the genomic information to understand disease mechanisms and to guide patient care, such as for diagnostic, prognostic and therapeutic decision-making. As part of it, huge amount of genomic sequencing data have been generated for both research and clinical purposes with drastic more such data anticipated in the future.

For example, cancer is considered a genetic disease. Using pediatric cancer which we are most familiar with as an example, pan-cancer analyses of pediatric tumors reveal a spectrum of nuclear somatic DNA alterations that vary by tumor type, and at least 8.5% of pediatric cancer patients have germline mutations in cancer predisposition genes. The patterns of these genomic alterations are distinctly different from one tumor type to another and one patient from another, which have been shown to be of diagnostic, prognostic and therapeutic importance and implications. For example, we developed a comprehensive next-generation sequencing panel, OncoKids, for pediatric cancers, which has demonstrated significant clinical utility in two years since its launch, with clinically significantly findings found in two thirds of 700 patients tested. Our clinical exome sequencing test, similarly, allowed us to identify pathogenic cancer predisposition variants in 8/106 (7.5%) patients tested. Such findings have all been enabled and empowered by the advent of massively parallel sequencing technologies, which led to 1 million fold decrease of the cost of sequencing a human genome since 2003, when the human genome project was completed. These genomic technologies have led to tremendously improved understanding of cancer etiology which, however, is only possible when the researchers and the patients are willing to share the genomic data. Again using our research experience as an example, we were able to establish the landscape of germline and somatic mitochondrial DNA mutations in pediatric cancers from mining the matched tumor-normal whole genome sequencing data of 621 pediatric cancer patients, collected and shared by the St. Jude's Children's Hospital instead based on these patients informed consent. Along with power and excitement, the tsunami of genomic data, however, also presents desperate needs for advanced informatics methodologies to facilitate genomic data sharing and to address the associated challenges, both technical and also from the legal and ethical points of view.

One such challenge relates to privacy concerns regarding access to and usage of the genomic data. The genomic sequencing data is deemed Personal Health Information (PHI) according to the Health Insurance Portability and Accountability Act (HIPAA) Privacy Rule, and also the General Data Protection Regulation recently established by the European Parliament and Council of the European Union. Since the genomic sequencing data could reveal the person's risks for various diseases, such as cancers and heart diseases, privacy concerns have been raised because of potential inappropriate use of the genomic sequencing data. While the Genetic Information and Nondiscrimination Act of 2008 (GINA) has made it illegal for health insurers or employers from discriminatory use of the genomic sequencing data, there is a lack of computational methodologies for an individual a) to protect his/her privacy risks while still benefiting from genomic medicine, b) to participate in genomic research which requires sharing genomic data for the general good of the society.

On the other hand, informed consent is now the essential component of any modern biomedical research involving human subjects. The notion of informed consent emerged after decades of atrocities, followed by tremendous efforts to address the problem that resulted in The Nuremberg Code, The Declaration of Helsinki, the Common Rule, and the Belmont Report. The conventional paper-based and static consent for a study with clearly specified goals and end points, however, could not meet the complexity and challenges of the emerging genomic research, which typically requires combining data sets from multiple studies, performing analyses that are not specified by each study at the time of consent, and making unanticipated discoveries. As such, dynamic consent is a new concept or a new consent model that is gaining support in the field. It engages all three pillars of informed consent, namely information, comprehension and voluntariness. It does so by providing a centralized computational platform that allows personalized online consent such that the consent by a potential participant can be a) done in real-time, b) granted to any researchers of choice, c) for any duration of choice, and d) for any purposes of choice. Dynamic consent promises even more granular controls of genomic data sharing by allowing the participants to control what specific portion of their genomic data can be shared, such as hiding sensitive data in specific disease genes like APOE, BRCA1/2 and other cancer predisposition genes, or neuropsychiatric disease genes.

Alternative to any consent model is the ownership-based governance. The patients or participants of any genomic study ultimately own their data, and should have the governance of the data, which includes the right to control the data and also the right to benefit from the value of the data. This provides the ultimate and most granular control of the participant's data but requires a distributed model that 1) is participant-centric, 2) does not require any centralized management. This model comes with significant technical challenges for the participants: a) to control what (portion of) data to share, with whom and for what duration, b) to track or trace data access, c) to prevent unauthorized access, d) to prevent illicit duplication and usage of the data, and e) to potentially benefit financially from sharing the data.

Either dynamic consent or ownership-based governance of accessing or sharing the genomic sequencing data, however, requires robust informatics tools to enable and to facilitate, in order to deal with the associated complexity while ensuring privacy preservation. Such algorithms or tools, however, are severely lacking. Currently, the genomic sequencing data of an individual is shared or not shared, decrypted or encrypted, all as a whole. This makes executing dynamic consent or honoring data owner's privacy concerns extremely challenging. As an example, the General Data Protection Regulation recently established by the European Parliament and Council of the European Union clearly defines the right of a participant of any study to revoke the consent. As it is now, however, once a participant consents to a study, which later combines and shares data with other studies, there is no practical way to erase the data and to prevent it from being used in the future.

SUMMARY

The disclosure addresses the above-described challenges by providing a set of algorithms and methods that are usable to dynamically encrypt and decrypt genomic sequencing data of user-specified genomic regions, such as specific genes (e.g. APOE and BRCA1/2). Fine-grained control policies, such as the time period when the data could be decrypted and accessed, are enabled using attribute-based encryption. With such features, the methods and systems of the disclosure enhance the privacy of the genomic sequencing data by: (1) giving full control over genomic data to the data owner; (2) enabling flexible, efficient, and precise partial encryption and decryption of genomic data. In this way, the disclosed features provide technical solutions to achieve principles of the above-described dynamic consent and ownership-based governance models, as well as other enhanced user controls regarding access to and usage of data.

Example innovations described in the disclosure are the novel use of a block cipher mode of operation, and the way the encryption is applied to genomic data. The data is encrypted once using the master encryption key; the data can be discarded after that. A novel index structure is designed to facilitate fine-grained data region control, to make sure that no additional data is exposed. The index allows the data owner to build keystreams (derived from the master encryption key) that decrypt specific genomic regions without sharing the master encryption key with other entities, and without the need to store the actual data.

Achieving a trustworthy genomic data sharing is imperative if the benefits anticipated from large-scale data sharing are to be realized. The algorithms, methods, and systems described herein enable true ownership-based governance of genomic sequencing data and greatly simplify the attempts to implement dynamic patient consent for biomedical studies. Using the described mechanisms, the data owner will be able to specify and revoke authorizations for data access and use. Such owner-centered data management will improve the trust relationship between the data owner and the data users, removing the barriers for genomic data sharing. Furthermore, with greatly simplified ownership-based governance of the genomic sequencing data, the owner, instead of large diagnostic or healthcare companies that generate and hence control the genomic sequencing data, could potentially benefit financially from sharing his or her own data, as it should be. Furthermore, it is to be understood that genomic data is provided herein as an example, and the disclosed systems and methods may be applied to dynamically encrypt and/or decrypt any suitable data or file type.

The foregoing and other objects, features, and advantages of the invention will become more apparent from the following detailed description, which proceeds with reference to the accompanying figures.

DETAILED DESCRIPTION

Figure 1:
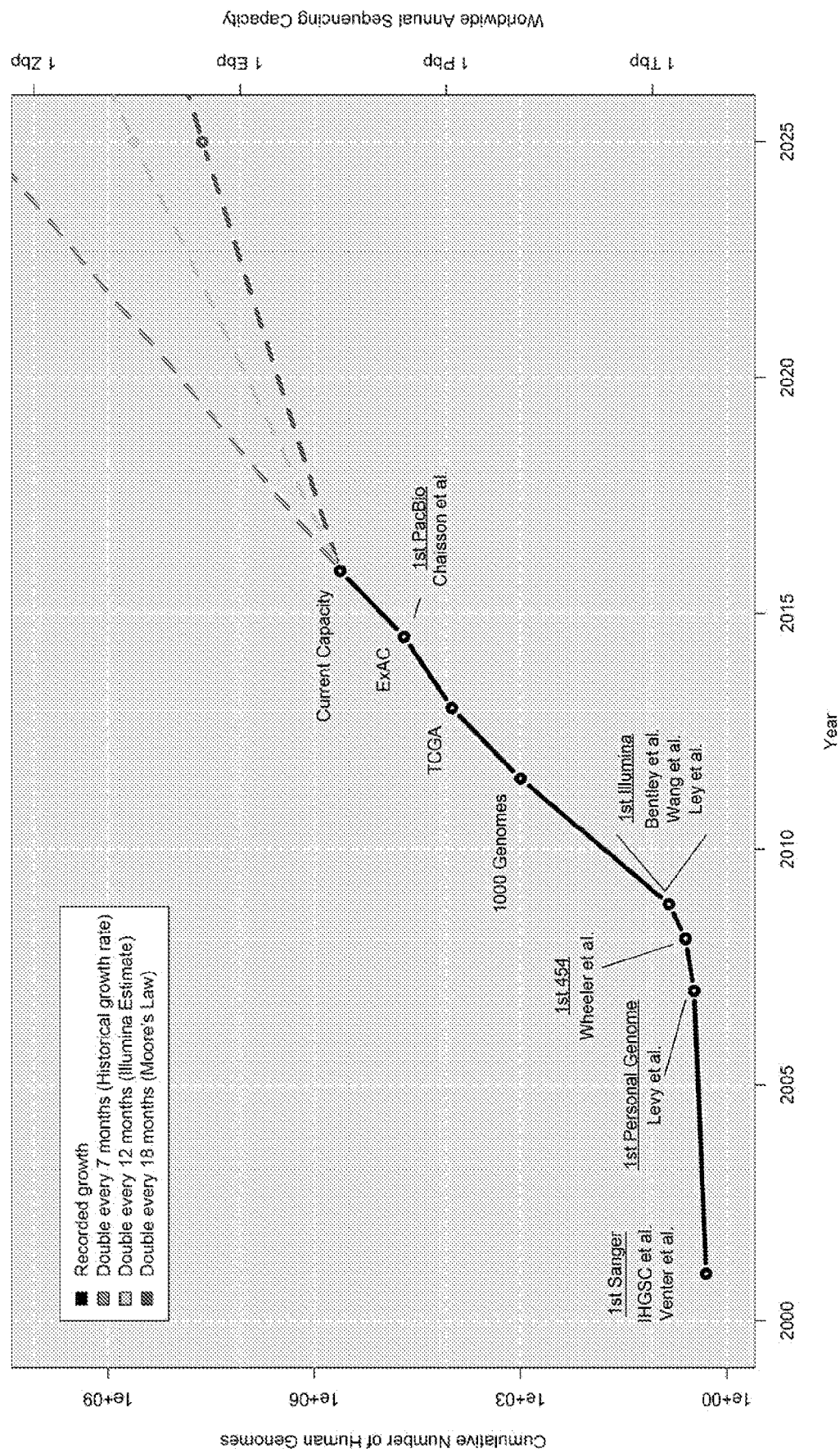
FIG. 1 shows the growth of DNA sequencing in terms of the overall sequencing capacity but also the number of human genomes sequenced each year and cumulatively.

Among legal and ethical challenges, how best to manage informed consent is likely the most critical. To a large extent, the conventional static and paper-based informed consent at the time of study enrollment could not address the complexity and could not accommodate the wide range of genomic data sharing needs and requirements. This has created significant hurdles for effective utilization of genomic data for both research and clinical purposes. For this reason, dynamic consent, as a new and alternative approach to consent participants for biomedical studies has gained popularity recently with the dynamic, real-time and direct communication between participants and researchers enabled, while putting the participants at the center of decision making Ideally, the decision as to a) whether or not to share the data, b) with whom to share the data, c) what data to share, d) in what format the data can be shared, and d) how long the data will be shared, can be rendered by a participant dynamically at any time. Despite its tremendous potential, however, there is a lack of informatics methodologies to execute or truly honor the decisions of a participant in real-time. And, a third party is still required to manage sharing preferences of all participants and to function as the communication or message broker between the participants and the researchers. The disclosure addresses these new challenges using the most cutting-edge bioinformatics and cryptographic technologies. In our preliminary study, we developed the LUBA-PrivET software system for dynamically encrypting and decrypting sequence or variant data of any particular genomic region(s) in a BAM file or a VCF file, which are the most common file format for storing NGS data and the standard format for storing genomic variants, respectively. We further implemented time-based constraints using a keystream release policy to allow a participant to share data only for certain period of time. The disclosure also provides for extending LUBA-PrivET functionalities to further address other challenges outlined above, with three specific aims:

Specific Aim 1. Implement flexible attribute-based access control. The LUBA-PrivET system is extended with the support for flexible, fine-grained policies using the attribute-based encryption (ABE). In addition to the time-based constraint, access is controlled based on other attributes, such as type of the data requestor (e.g., relative, member of a particular organization), country or location of the requestor, minimum age of the data owner at the time of data release, etc.

Specific Aim 2. Extend the system with the blockchain technology to track the data release and processing transactions. With dynamic consent, proper audit is critically important in order to maintain privacy and transparency. For this purpose, the LUBA-PrivET system is extended with the blockchain technology to implement consistent and decentralized audit.

Specific Aim 3. Design and implement a secure and data utility preserving novel watermarking scheme for genomic data to deter and track unauthorized use of data. We cannot trust the data consumers to comply with the access control policies after the data is released, not to store and not to re-use the data after the expiration date/time, or not to distribute the data to unauthorized parties. To address this problem, a novel secure watermarking scheme is implemented for secure genomic data sharing.

Once fully implemented, we believe that LUBA-PrivET should greatly empower cancer genomic research.

Research Strategy

FIG. 1 shows an example plot of the growth of DNA sequencing. The plot shows the growth of DNA sequencing both in the total number of human genomes sequenced (left axis) as well as the worldwide annual sequencing capacity (right axis: Tera-basepairs (Tbp), Peta-basepairs (Pbp), Exa-basepairs (Ebp), Zetta-basepairs (Zbps)).

A. Significance

In a perspective article, Stephens et al compared genomics with other major sources of Big Data including astronomy, and concluded that genomics was likely the most demanding in terms of all 4 major aspects of Big Data, namely data acquisition, storage, distribution, and analysis. The main figure of the article nicely illustrated the astronomical or rather genomical growth of DNA sequencing in terms of the overall sequencing capacity but also the number of human genomes sequenced each year and cumulatively (FIG. 1).

Cancer research benefits directly from the genomical (astronomical) growth of sequencing capacity, highlighted by The Cancer Genome Atlas program, the landmark cancer genomics study that started in 2006 with the advent of massively parallel sequencing technologies. With sequencing of over 20,000 primary cancers across 33 cancer types, there have been much increased understanding of the genomic alterations and landscapes of a variety of tumor types over the years, starting in 2008 for glioblastoma, and subsequently for ovarian cancers, colon and rectal cancers, breast cancers, lung cancers, melanoma, and prostate cancers, just to name a few. TCGA studies are of course not the only cancer genomic studies. There have continuously been more and larger genomic studies with more tumors studied, more patients involved, and more insights gained. This is driven largely by the drastically decreased sequencing cost and increased sequencing capacity over the last decade, but more importantly by the increased participation of cancer patients and the effective sharing of their genomic data across medical institutions and across the continents. Recognizing the power from, and the need for, sharing the genomics data, there have been a number of large international initiatives aiming to encourage and to facilitate genomic data sharing, exemplified by the International Cancer Genome Consortium (ICGC), started in 2007 in Canada, with now whole genome sequencing data of over 25,000 primary untreated cancers from 18 countries or jurisdictions readily accessible through the ICGC Data Portal. Like TCGA, ICGC has enabled a number of breakthrough discoveries, such as for myelodysplasia, for pediatric glioblastoma, and for medulloblastoma. There have also been many large genomic initiatives focusing on specific diseases including but not limited to specific types of cancers, such as the pancreatic cancer and the prostate cancer. Recognizing the benefits of genomic data sharing, for both clinical and research purposes, as well as the associated challenges, the Global Alliance for Genomics & Health (GA4GH), aims to develop consensus statements, guidelines, technical standards as well as software toolkits to facilitate genomic data sharing.

What constitutes the most appropriate informed consent is likely the most significant challenge, along with other ethical and legal issues. Dankar et al reviewed the evolution of the notion of informed consent and its importance in biomedical research most recently. The notion of informed consent emerged after decades of atrocities, followed by tremendous efforts to address the problem that resulted in The Nuremberg Code, The Declaration of Helsinki, the Common Rule, and the Belmont Report. Informed consent is now the essential component of any modern biomedical research involving human subjects. Information, comprehension and voluntariness are the three pillars that define informed consent in general as the full disclosure of the nature of the research and involvement of the participant, and adequate comprehension by the participant, followed by the participant's voluntary choice to participate or not.

Informed consent, as defined above, however, creates many challenges, in the forms of privacy and ethical issues, in the Big Data era or specifically the precision medicine era, which requires wide and extensive sharing of the genomic data by many institutions, across multiple studies and by a large number of investigators. First of all, privacy cannot be guaranteed when genomic data is shared regardless the amount of effort invested, certainly not with simple anonymization. Genomic data is recognized as an identifiable biometric according to HIPPA, since as few as 30-80 SNPs could uniquely identify an individual. Multiple studies clearly demonstrated the improbability of de-identifying genomic data completely: the identities of 50 anonymous male participants of the 1000 Genome Project were revealed by Bymrek et al. by analyzing the Y-chromosome and using surname inference; some participants of the Personal Genome Project could also be re-identified by triangulating the genomic data with demographic data; some participants of the 1000 Genome Project were re-identified using genealogical knowledge from publicly available records. The privacy risk extends to family members of the participants of a biomedical study. Secondly, the genomic data contains sensitive information such as the risks and predispositions to diseases such as cancers, Alzheimer's, and neuropsychiatric disorders. For this reason, Dr. James Watson requested that data from his ApoE gene redacted before making the genomic sequencing data available when his genome was sequenced. Although the Genetic Information Non-discrimination Act (GINA) was written in law in 2008, which prohibits any discrimination by insurers and employers based on the genetic traits of an individual, it is believed to be difficult to enforce because of the difficulty in establishing the proof. Thirdly, the conventional informed consent is meant for a single study with well-specified design and goals at time of enrollment. It is therefore static and freezes the consent information at the time of consent. This requires that all future uses of the data be disclosed at the initial consent, which is unrealistic or rather impossible in the Big Data era with frequent data sharing, data repurposing and data aggregation. Fourthly, the "information" and "comprehension" pillars of informed consent are challenged with genomic data sharing when it is a) not possible to estimate or quantify the risks, including especially the privacy risk as described above, b) unforeseeable usage and discovery of the data, and c) the extreme complexity associated with explaining and understanding the implications of genomic data sharing, largely because of the lack of such knowledge in the broader scientific community. Fifthly, consent revocation is an essential part of "voluntariness". It was declared, for example, by GDPR (General Data Protection Regulation) most recently that "it should be as easy to withdraw consent as to give it". Consent revocation, however, presents huge practical challenges when involving a large amount of genomic data that are stored, managed and shared by many researchers across multiple institutions in many different ways. The current practices typically apply withdrawal only to future data collection and processing, but not the processed data in use already, which is not truly a withdrawal. As such, the conventional informed consent, which is meant for a well defined study with clearly stated goals, time span, and well explained risks and benefits, is no longer suitable for current biomedical research involving collecting and analyzing the genomic data of the participants or patients. New and alternative approaches are required.

One approach is to adopt the so-called "broad" or "blanket" consent that authorizes all, unlimited and unforeseeable future usages, as done by most of biobanks and biomedical data warehouses. While promoted by many researchers, as well as the recent revision of the Common Rule, broad consent is nonetheless criticized by many as greatly restricting in terms of the autonomy of potential participants. Although a variant of the broad consent, the tiered consent provides participants the selection of general research areas to participate, hence more autonomy, neither broad nor tiered consent is comparable to the conventional informed consent when it comes to autonomy. Opt-out consent model is even more controversial and not believed by many as ethical, since it may take advantage of people in vulnerable moments.

On the other hand, dynamic consent is a new concept or a new consent model that enforces all three pillars of informed consent. It does so by providing a centralized computational platform that allows personalized online consent such that the consent can be a) done in real-time, b) granted to any researchers of choice, c) for any duration of choice, and d) for any purposes of choice. Dynamic consent promises even more granular controls of genomic data sharing by allowing the participants to specify, hence to control, what portion of, instead of all, the genomic data can be shared, such as hiding sensitive data in specific disease genes like ApoE, as desired by Dr. Watson, BRCA1/2 and other cancer predisposition genes or neuropsychiatric disease genes. It should be particularly noted that dynamic consent is participant-centric, providing significantly more autonomy for the participants than conventional informed consent. Dynamic consent is therefore gaining significant popularity in the field of genomic medicine lately since it addresses or overcomes many of challenges described above, especially for participants or patients who have had their genomes or tumor genomes sequenced already. Practically, however, it comes with significant overhead or implementation cost because of the complexity of the system and the amount of computational resources required for managing the genomic data of all participants. Since the preferences are managed by a centralized computational system, it also presents a single point-of-failure and an attractive target for malicious attacks.

Alternative to any consent model is the ownership-based governance. The patients or participants of any genomic study ultimately own their own data, and should have the governance of the data, which include the right to control the data and also the right to value of the data, being economic or intellectual. This is a distributed model that 1) is participant-centric, 2) does not require any centralized management, and 3) provides the ultimate and most granular control of the participant's data. This model comes with its own challenges, mainly the technical challenges for the participants, or the data owners, a) to control what (portion of) data to share, with whom and for what duration, b) to track or trace data access, c) to prevent malicious or unpermitted access, d) to prevent illicit duplication and usage of the data, and e) to potentially benefit financially from sharing the data. The disclosure relates to a set of cutting-edge bioinformatics algorithms and cryptographic software tools that address these technical challenges. These algorithms and tools can be used either as standalone tools for a number of situations or needed as described below, or as part of a dynamic consent platform. In the later case, we are essentially providing a hybrid model of dynamic consent and ownership-based governance. With such a model, it would i) drastic reduce the cost for implementing and maintaining a dynamic consent platform because of the distributed nature of ownership-based governance, ii) make it possible to establish a genomic data exchange to promote and to facilitate genomic data sharing, iii) make it truly possible for a participant to "revoke the consent" by simply not sharing the data anymore with anybody or any particular research of choice, and iv) relieve the "data holders" the liability from improper handling of the participants' data and the inability to honor the decisions of the participants thoroughly and in real-time.

B. Innovation

To our knowledge, there have not been any bioinformatics tools that enable dynamic control as to whether or not genomic sequencing data of a particular genomic region or gene can be encrypted or decrypted, let alone dynamic controls as to with whom and for how long the data can be shared. In some examples, the disclosed systems and methods use the blockchain technology to track or audit data access, release and processing transactions. In addition to using blockchain technology for tracking the transactions of genomic data, the disclosure describes applying blockchain technology for dynamically encrypting and decrypting data belonging to any genomic regions of interest or choice which has, to our knowledge, never been attempted before. The disclosure also provides for watermarking genomic data and using the watermarking to enable and to facilitate genomic data sharing at the global level, and in the context of ownership-based governance. Together, the suite of algorithms and informatics solutions that are disclosed for genomic data sharing should be broadly enabling for both research, academic or commercial purposes, significantly impacting cancer research and clinical cancer care.

In one example, the LUBA-PrivET software system is configured for dynamically encrypting and decrypting sequence or variant data of any specified genomic region(s) in the most common file format for storing genomic sequencing data, the BAM format.

Dynamic Encryption and Decryption

1 Introduction

Figure 2A:
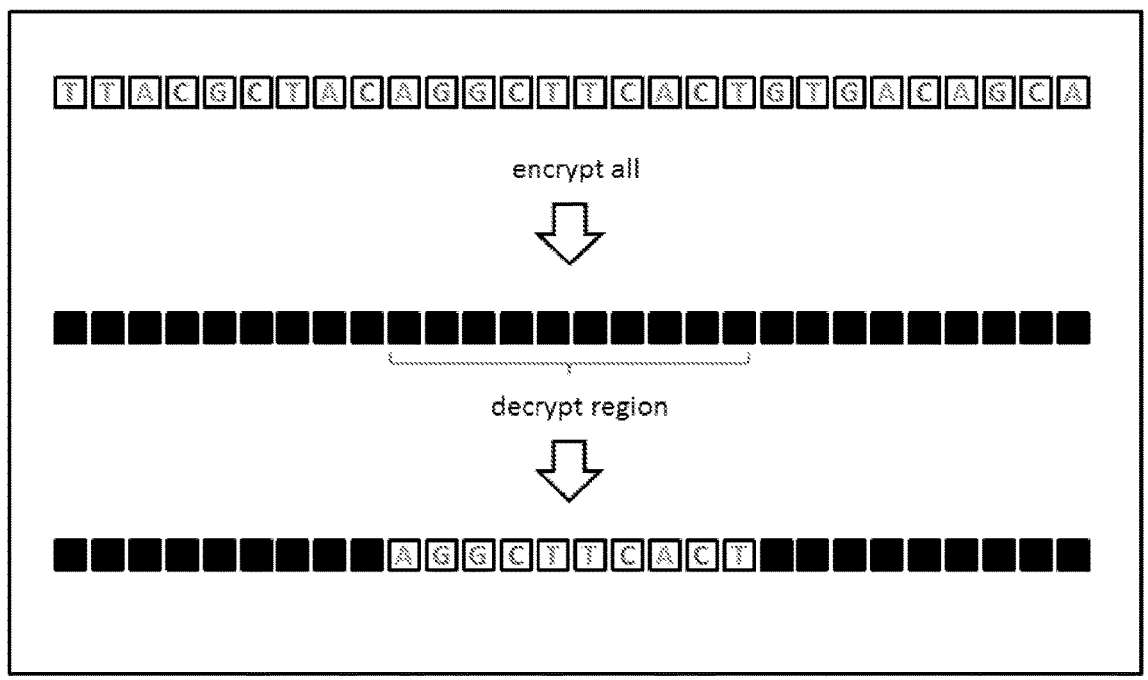
FIG. 2A shows an example process for encrypting a genomic region.

The present disclosure includes a dynamic privacy preserving encryption scheme for genomic sequencing data. Either the whole BAM file or a portion of the file can be encrypted. FIG. 2A shows an example process for encrypting a whole BAM file. The example includes an option to decrypt a specific genomic region or the whole BAM file.

Figure 2B:
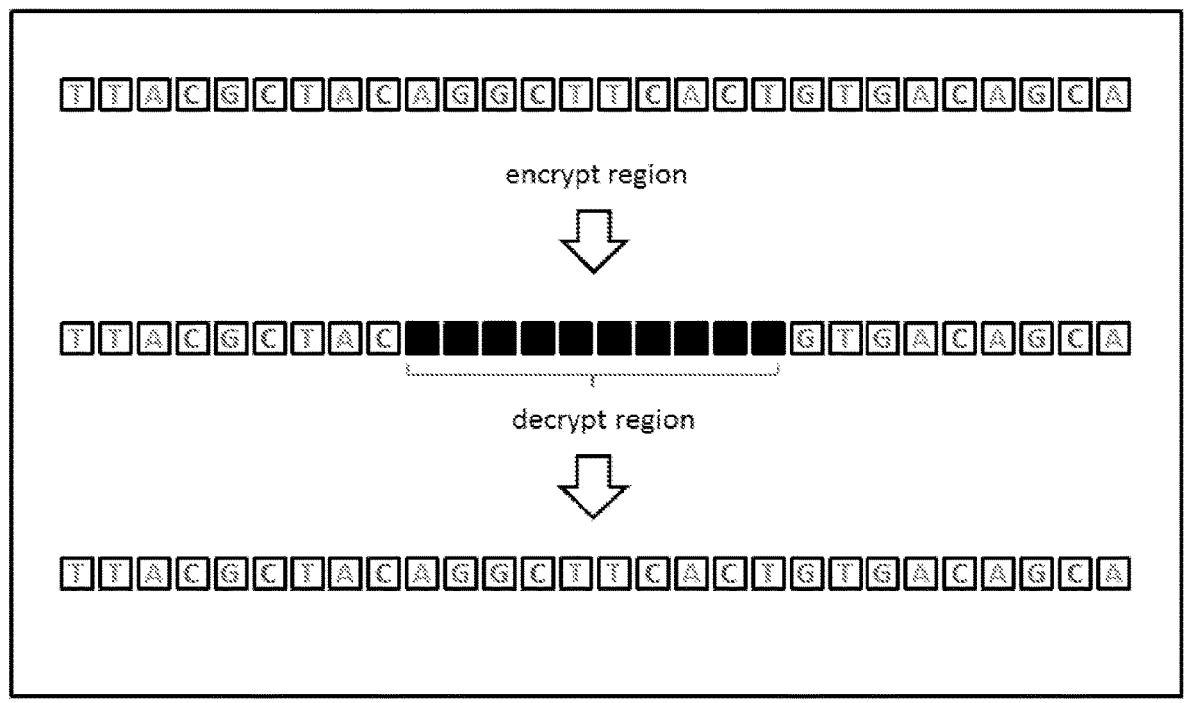
FIG. 2B shows an example process for encrypting a genomic region.

FIG. 2B shows an example process for encrypting a genomic region. The example has an option to decrypt the whole encrypted region or a part of it.

The owner of the genomic data can choose to share keystreams that decrypt specific genomic regions of the encrypted BAM file.

2 Sequencing Data Format

Aligned genomic sequences, or reads, are stored in Binary Alignment Map (BAM) files. BAM files are compressed using a variant of GZIP (GNU ZIP), called BGZF (Blocked GNU Zip Format). BGZF files are split into small blocks which are compressed individually. This block structure allows to build indexes for sorted compressed files, and to extract specific regions without having to decompress the entire file.

Figure 3:
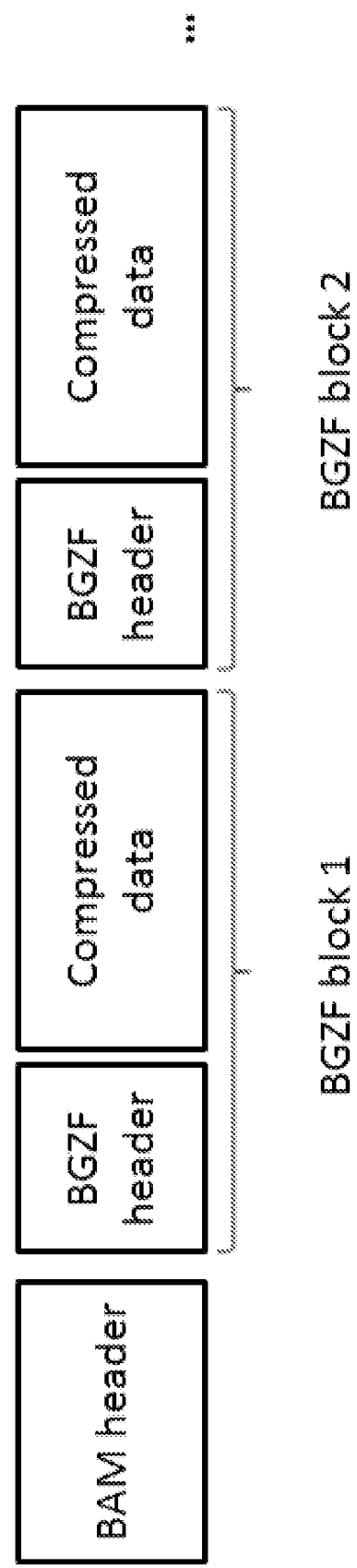
FIG. 3 schematically shows an example Binary Alignment Map (BAM) file.

Typically, BAM files are large and consist of many compressed BGZF blocks. The size of an uncompressed block, and therefore the compressed block, is limited by $2^{16}$ bytes. Each block has an uncompressed header that contains the size of the compressed block. A BAM file starts with a main uncompressed BAM header, as shown in FIG. 3.

Since an entire BGZF block is compressed, the encryption is applied on the block level. The BAM files are sorted and indexed for random access. The indexing scheme is optimized to reduce the number of seek operations within a file, rather than to facilitate fine-grained region access. After the seek operation finds a BGZF block that precedes the region of interest, a linear search is typically needed to find aligned reads that overlap with the requested region.

Related Work: "BGZF Block-Level Encryption for VCF, BCF, BAM (and Anything BGZF Compressed)"

BGZF block-level encryption was implemented as a proof of concept, and is available as a branch of BCFTools on github.

The encryption scheme is based on the Advanced Encryption Standard (AES-256) symmetric key algorithm. A BGZF file (VCF, BCF or BAM) is encrypted on block-level, so that the encrypted file is indexable for random access.

The implemented scheme uses AES library functions directly, and the encrypted data is padded to 256-byte AES blocks. AES initialization keys are stored in the BGZF headers, and the file can be decrypted with a single secret AES key. Ultimately, given the secret AES key, any part of the file can be decrypted: in contrast to the methods and systems of the present disclosure, specific regions cannot be kept private.

3. Dynamic Encryption Scheme

Figure 4A:
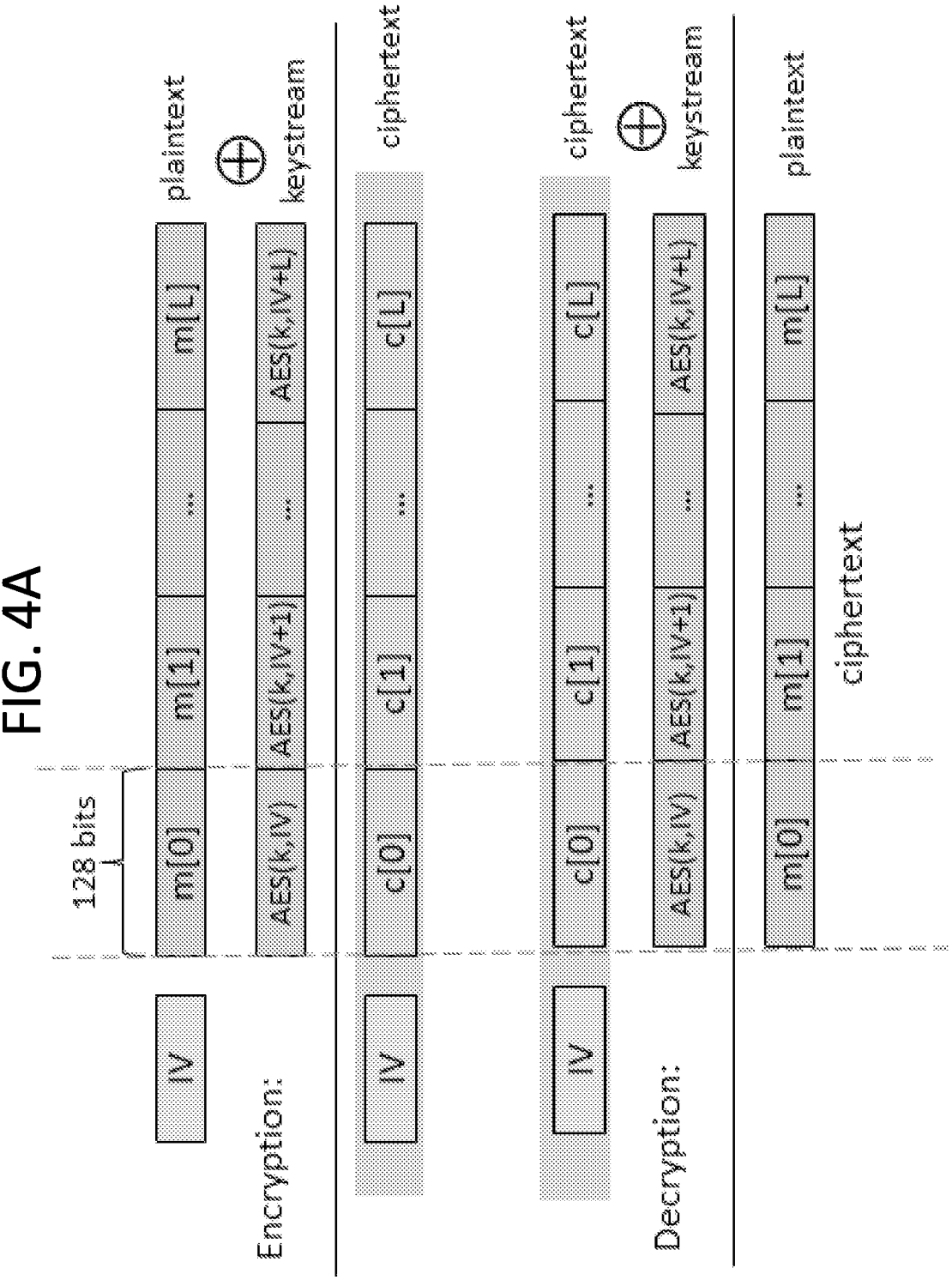
FIGS. 4A and 4B show example encryption schemes.
Figure 4B:
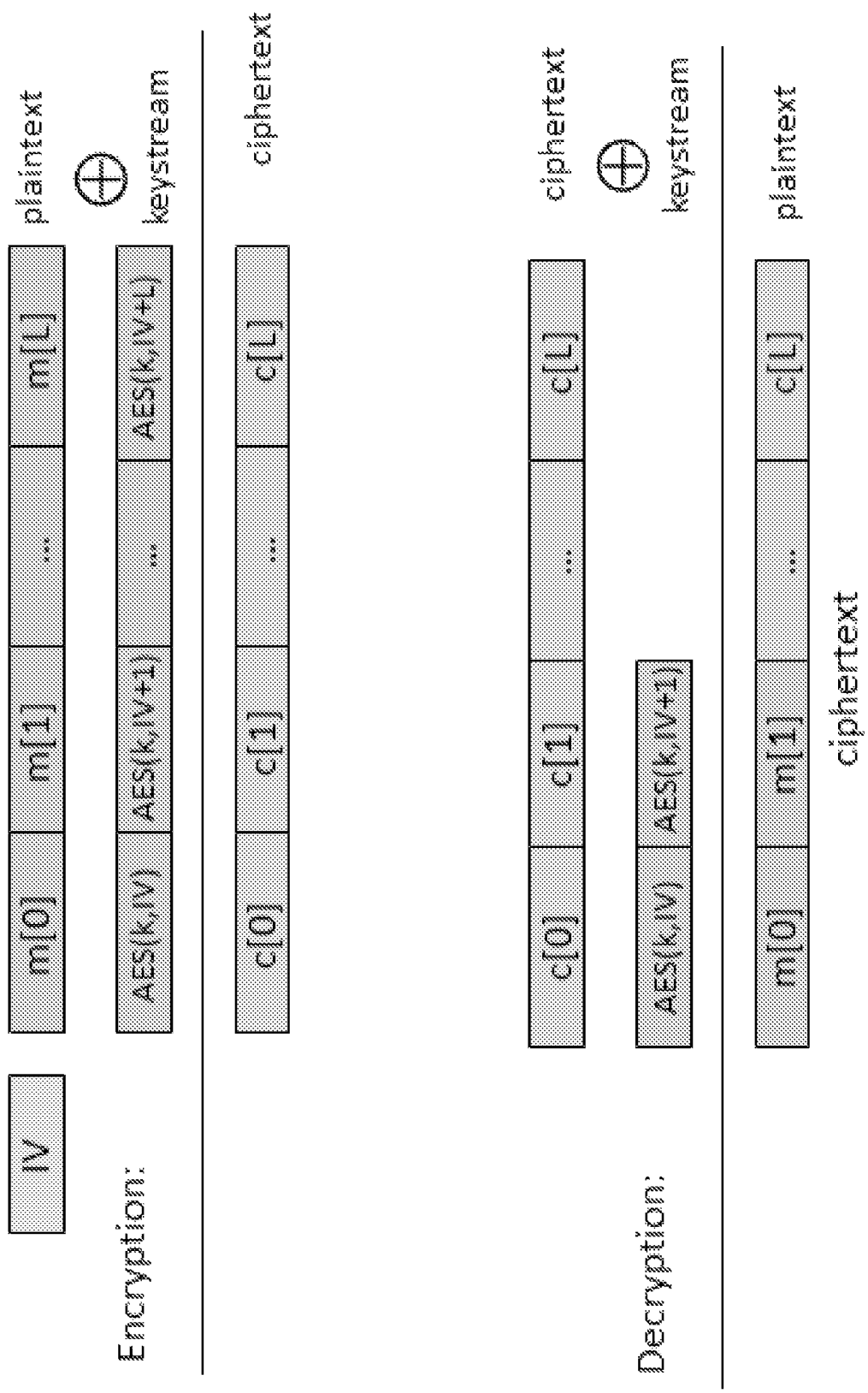

FIGS. 4A and 4B show example encryption schemes. To encrypt a BAM file, we utilize AES-CTR-randomized CTR-mode with 128-bit key AES [RFC 3686].

Each AES encrypt operation generates 128 bits of keystream. AES-CTR encryption is the XOR of the keystream with the plaintext. AES-CTR decryption is the XOR of the keystream with the ciphertext. If the generated key stream is longer than the plaintext or ciphertext, the extra key stream bits are simply discarded. For this reason, AES-CTR does not require the plaintext to be padded to a multiple of the AES block size.

Binary BAM file (plaintext) is broken into L blocks ($m[i]$). The size of each block (with a possible exception of the last block) is 128 bits. Encryption algorithm chooses (at random) a new initialization vector (IV) for every BAM file.

To enable a partial decryption of the BAM file, we reveal only the corresponding portion of the generated key stream. The secret AES key k and IV-s are never exposed.

For example, to allow decryption of the blocks $c[0]$ and $c[1]$ only, two blocks of the key stream (AES(k,IV) AES(k, IV)) will be revealed. Thereby, only two blocks of the plaintext ($m[0]$ and $m[1]$) will be decrypted.

4. Implementation Details

The main BAM header and the BGZF block headers are left unencrypted. BGZF headers of the encrypted blocks are replaced with GZ-compatible custom BGZF headers to distinguish them from unencrypted blocks. When the whole genome or a specific region of a fully or partially encrypted BAM file is requested, the program will check whether a block is encrypted or not, and will process the blocks that are either unencrypted or have the corresponding keystreams available.

To generate keystreams for specific BGZF blocks, the offsets of the blocks from the beginning of the file, as well as the lengths of the blocks are determined. Both offsets and lengths can be extracted from the unencrypted BAM during the encryption procedure, and subsequently the original file will not be needed to generate the keystreams.

To jump to the correct block given a genomic region (or a specific gene name), the left-most and the right-most positions of the aligned reads present in the block are determined. Thus, during the encryption procedure, as we process the unencrypted BAM, we simultaneously build the block index, writing the following values for each block:

chromosome leftmost_position rightmost_position offset length

Since the block index file is in a BED-like format, it is BGZF-compressed and indexed for random access.

The end of the main BAM header is the start of the portion of the file that can potentially be encrypted. By calculating the number of bits between the end of the BAM header and the beginning of the BGZF block, we determine the first initialization vector (IV) corresponding to the BGZF block, and the offset from the beginning of the 128-bit AES block. The keystream is then generated by repeatedly calling the AES(k,IV) function for all 128-bit intervals of the BGZF block.

Fully or partially encrypted BAM files cannot be indexed with HTSLib samtools index. Therefore, we build the BAM index on the fly, while processing the data. Each BGZF block is processed in the following steps: 1. Read the block from the file and decompress. 2. Get the start and end positions for each read and save them along with the read offset from the start of the block. 3. Update the block encryption index. 4. Update the BAM index using the saved read positions and offsets. 5. Encrypt the compressed block if needed. 6. Write the block out. The BGZF index is needed for random access within the encrypted BAM file, but is not relied upon to generate the keystreams.

Our dynamic encryption system, LUBA-PrivET (Privacy Enabling Tool), is implemented as part of the in-house software system LUBA (Lightweight Utility for Bioinformatics Analysis) that we developed at the Center for Personalized Medicine (CPM). The system incorporates a number of tools and algorithms developed specifically for our clinical needs: somatic variant caller, CNV algorithm, tool to resolve the phase of heterozygous variants, coverage analysis tool, and other utilities to compare and analyze VCF, BAM and FASTQ files. Similarly to other LUBA tools, LUBA-PrivET is a fast and easy to use command-line application written in C++. It is available on the github.

In Section 6 a demo of the LUBA-PrivET tool is presented.

5. Contributions

Currently, it is practically impossible to encrypt the whole file and decrypt just a part of the file using the same key. Our novel application of the CTR block cipher mode of operation supports dynamic partial encryption and decryption of BAM files employing just one key. In typical secret key cryptographic settings, the secret key has to be shared between the parties, increasing the attack surface. In the disclosed method, the secret master key that encrypts BAM file is never shared with any other entity, which results in a decreased attack surface and increased privacy protection.

Partially or fully encrypted genomic data can be stored in a public or a semi-public data storage, e.g., a Big Data platform, a cloud-based system. These data storage facilities cannot decrypt the encrypted information. The owner of the data can discard the large BAM file, since only the master key and a small block index file are needed for decryption. An access to specific genomic regions, which may be encrypted, can be given by the owner to trusted parties to conduct clinical analysis or research.

A custom lightweight index facilitates fast retrieval of block data needed for decryption. The index supports fine-grained control over the release of the sensitive genomic data—no additional information is revealed, thus increasing privacy guarantees.

Our implementation is efficient and flexible. It relies on secret key cryptography, thus avoiding considerable overhead of the public key cryptography. Only a single secret key is required. Rapid cryptographic operations, based on a simple XOR, result in fast processing of large BAM files. The performance can be further improved by parallelizing the encryption and decryption procedures. Our scheme requires no padding of the encrypted data: no extra storage is needed while the structure of a BAM file is preserved. AES can be replaced with other cryptographic constructions, for example, Salsa20.

Figure 5:
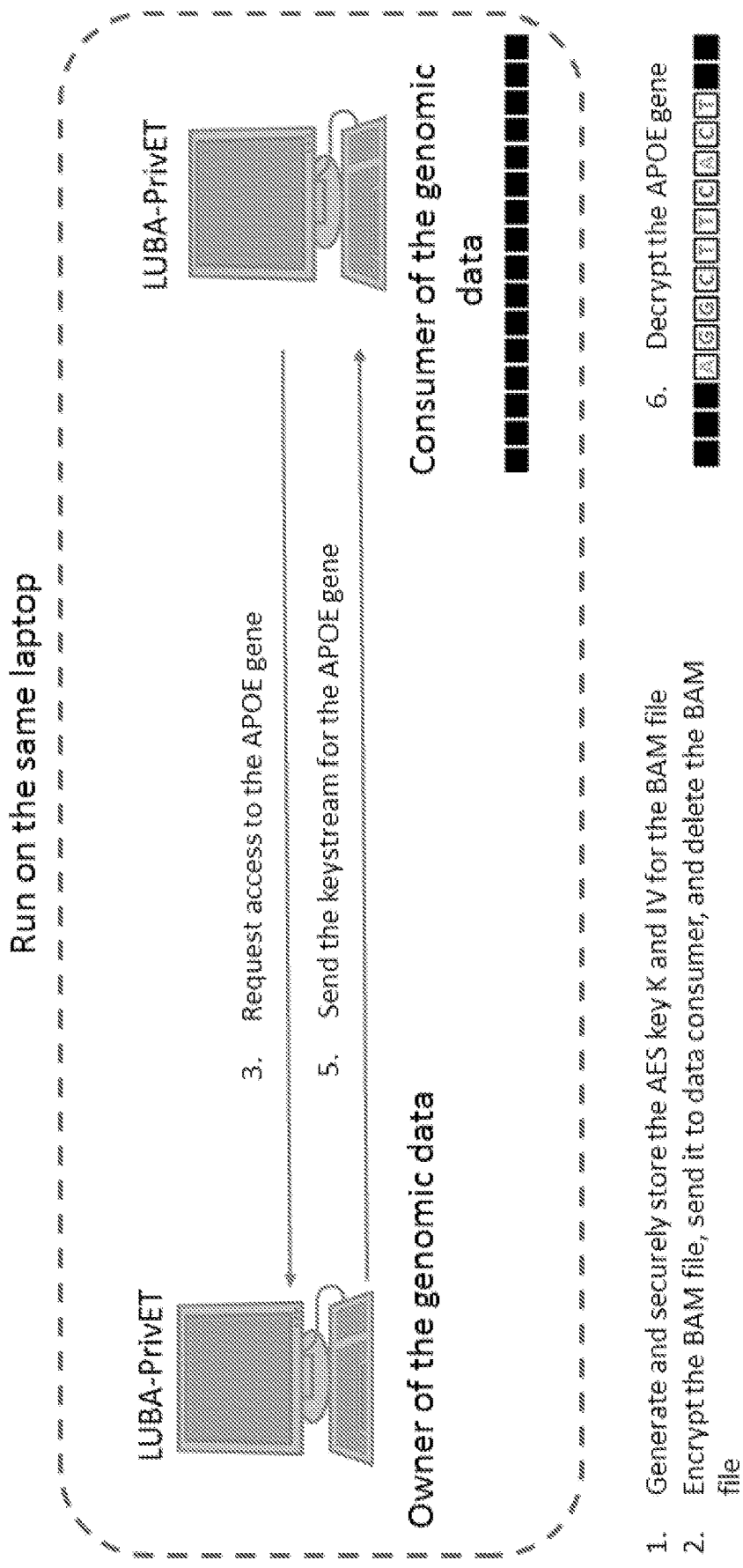
FIG. 5 shows an example of hiding a whole genomic sequence.

6. LUBA-PrivET Dynamic Encryption Demo
Demo A: Hiding the whole genomic sequence.
An example of hiding the whole genomic sequence is shown in FIG. 5.
Data Owner encrypts the original Bam file: three files are generated, AES Master key, LUBA Encryption Index and the fully encrypted BAM file:
data_owner$ ll
-rw-r--r-- 1 ayutov ayutov 523431006 May 14 13:38 CPM00000001.chr19.bam
-rw-r--r-- 1 ayutov ayutov 114096 May 14 15:46 CPM00000001.chr19.bam.bai
data_owner$ privet -m encrypt -b CPM00000001.chr19.bam
Output:
 AES Master key: "CPM00000001.chr19.aes_key.bin"
 LUBA Encryption Index: "CPM00000001.chr19.lei.gz"
 Fully encrypted BAM: "CPM00000001.chr19.enc.bam"
PrivET finished in 12 seconds.
data_owner$ ll
-rw-rw-r-- 1 ayutov ayutov 244 May 15 12:26 CPM00000001.chr19.aes_key.bin
-rw-r--r-- 1 ayutov ayutov 523431006 May 14 13:38 CPM00000001.chr19.bam
-rw-r--r-- 1 ayutov ayutov 114096 May 14 15:46 CPM00000001.chr19.bam.bai
-rw-rw-r-- 1 ayutov ayutov 523431006 May 15 12:26 CPM00000001.chr19.enc.bam
-rw-rw-r-- 1 ayutov ayutov 114096 May 15 12:26 CPM00000001.chr19.enc.bam.bai
-rw-rw-r-- 1 ayutov ayutov 602736 May 15 12:26 CPM00000001.chr19.lei.gz
-rw-rw-r-- 1 ayutov ayutov 8524 May 15 12:26 CPM00000001.chr19.lei.gz.tbi
Data Owner "sends" the encrypted file to Data Consumer and deletes the original BAM:
data_owner$ my CPM00000001.chr19.enc.bam*~/data_consumer
data_owner$ rm CPM00000001.chr19.bam*
If Data Consumer attempts to look into the encrypted BAM files using SAMTools or the IGV (Integrated Genomic Viewer), an error message is thrown:
data_consumer$ samtools view CPM00000001.chr19.enc.bam
[main_samview] truncated file.
Data Owner is asked to open the APOE gene. She generates the APOE keystream with the AES Master key and the LEI file, and "sends" the keystream to Data Consumer:
data_owner$ privet -m keystream -l CPM00000001.chr19.lei.gz -r gene APOE -a CPM00000001.chr19.APOE.keystream.bin
Output:
 Keystream:
  "CPM00000001.chr19.APOE.keystream.bin"
PrivET finished in 1 seconds.
data_owner$ ll
-rw-rw-r-- 1 ayutov ayutov 244 May 15 12:26 CPM00000001.chr19.aes_key.bin
-rw-rw-r-- 1 ayutov ayutov 163516 May 15 12:28 CPM00000001.chr19.APOE.keystream.bin
-rw-rw-r-- 1 ayutov ayutov 602736 May 15 12:26 CPM00000001.chr19.lei.gz
-rw-rw-r-- 1 ayutov ayutov 8524 May 15 12:26 CPM00000001.chr19.lei.gz.tbi
data_owner$ my CPM00000001.chr19.APOE.keystream.bin~/data_consumer
Now Data Consumer can extract the APOE region, and only the APOE region, from the encrypted BAM file with the APOE keystream, and view it with SAMTools or the IGV:
data_consumer$ privet -m view -b CPM00000001.chr19.enc.bam -r gene APOE -a CPM00000001.chr19.APOE.keystream.bin
Output
 Decrypted region(s) BAM: "CPM00000001.chr19.enc.dec.bam".
PrivET finished in 0 seconds.
data_consumer$ ll
-rw-rw-r-- 1 ayutov ayutov 163516 May 15 12:01 CPM00000001.chr19.APOE.keystream.bin
-rw-rw-r-- 1 ayutov ayutov 523431006 May 15 11:21 CPM00000001.chr19.enc.bam
-rw-rw-r-- 1 ayutov ayutov 114096 May 15 11:21 CPM00000001.chr19.enc.bam.bai
-rw-rw-r-- 1 ayutov ayutov 139104 May 15 12:02 CPM00000001.chr19.enc.dec.bam
-rw-rw-r-- 1 ayutov ayutov 22944 May 15 12:02 CPM00000001.chr19.enc.dec.bam.bai
data_consumer$ samtools view CPM00000001.chr19.enc.dec.bam|less
NB501047:10:HLJGYBGXX:3:12611:21719:9541 83 19 45409028 60 100M=45408988-140 TGGACAAGTCTGG-GATCCTTGAGTCCTACTCAGCCCCAGCGGAGGT-GAAGGACG TCCTTCCCAAGGAGCCGGTGAGAAGC GCAGTCGGGGGCACGGGGAT E//<AEEEE/AEE//AE/EE<EAE6//EEE/EE/E//</AEEEEEA<EEEEAEAEA EEEEEEEAAE/E /EEE6EE/EAEEEE/EE/E/E//E/EE-AAAAA NM:i:1 MD:Z:62C37 AS:i:95 XS:i:0 RG:Z:CPM00000001-B-D-3_20180104 MQ:i:60 ms:i:2572 mc:i:45408988 MC:Z:101M
The full original BAM file can be regenerated only with the AES Master key. Since Data Owner never shares her AES Master key, she requests the encrypted BAM to be sent back to her:

```
data_consumer$ cp CPM00000001.chr19.enc.bam*~/data_
   owner
data_owner$ privet -m decrypt -b CPM00000001.chr19.
   enc.bam -k
   CPM00000001.chr19.aes_key.bin                -o
   CPM00000001.chr19.full.bam
PrivET finished in 6 seconds.
data_owner$ll
-rw-rw-r-- 1 ayutov ayutov    244 May 15 12:16
CPM00000001.chr19.aes_key.bin
-rw-rw-r-- 1 ayutov ayutov 523431006 May 15 11:21
CPM00000001.chr19.enc.bam
-rw-rw-r-- 1 ayutov ayutov    114096 May 15 11:21
CPM00000001.chr19.enc.bam.bai
-rw-rw-r-- 1 ayutov ayutov 523431006 May 15 12:17
CPM00000001.chr19.full.bam
-rw-rw-r-- 1 ayutov ayutov    114096 May 15 12:17
CPM00000001.chr19.full.bam.bai
-rw-rw-r-- 1 ayutov ayutov    602736 May 15 12:26
CPM00000001.chr19.lei.gz
-rw-rw-r-- 1 ayutov ayutov     8524 May 15 12:26
CPM00000001.chr19.lei.gz.tbi
```

Demo B: Hiding the APOE Gene Only.

Figure 6:
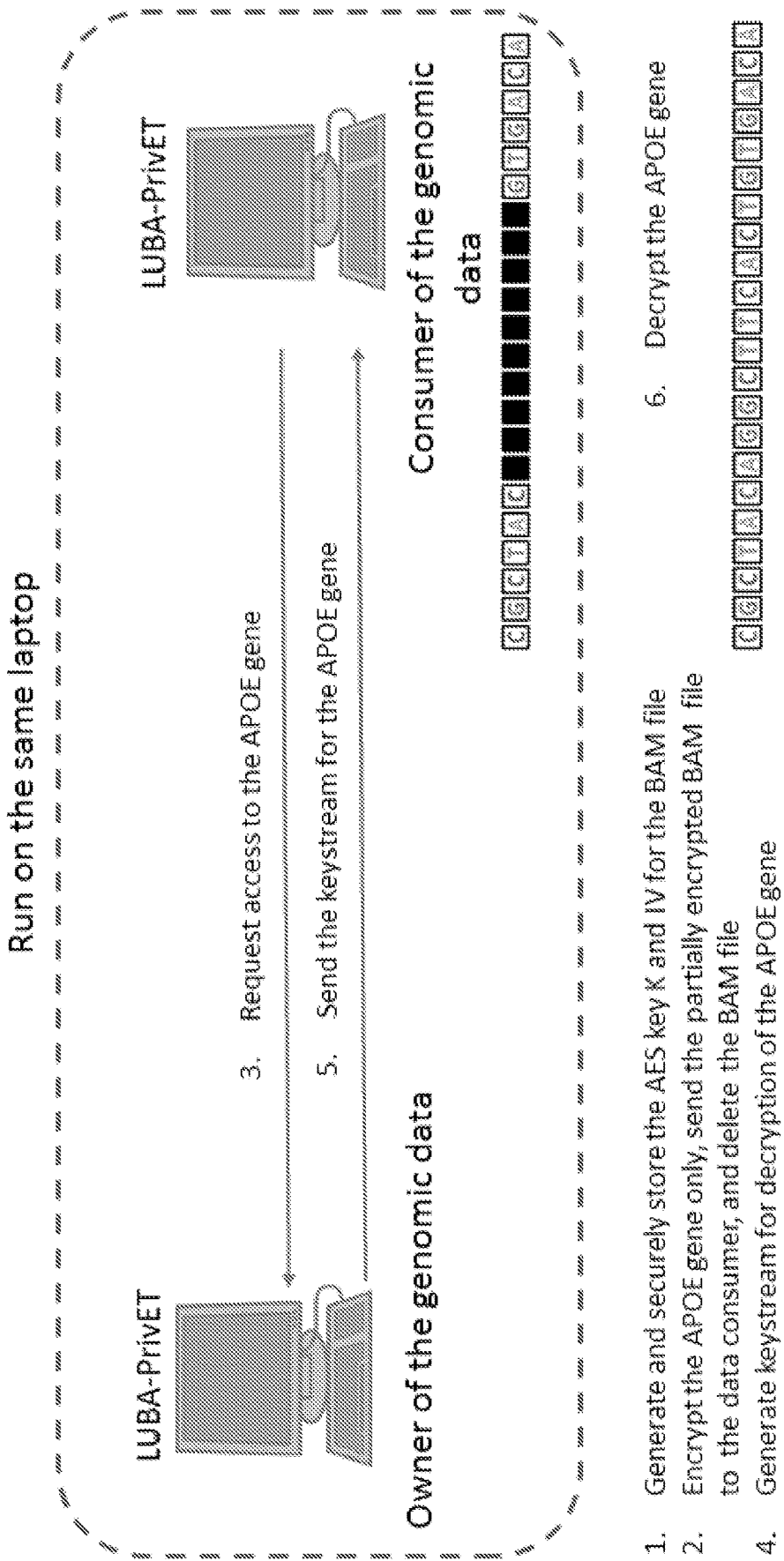
FIG. 6 shows an example of hiding the APOE gene only.

An example of hiding the APOE gene only is shown in FIG. 6.

Data Owner encrypts the APOE gene region in the BAM file: three files are generated, AES Master key, LUBA Encryption Index and the partially encrypted BAM file. Data Owner "sends" the partially encrypted file to Data Consumer and deletes the original BAM file.

```
data_owner$ll
-rw-r--r-- 1 ayutov ayutov 342228992 May 15 11:10
CPM00000001.chr19.bam
-rw-r--r-- 1 ayutov ayutov    114096 May 14 15:46
CPM00000001.chr19.bam.bai
data_owner$ privet -m encrypt -b CPM00000001.
   chr19.bam -r gene APOE
Output:
   AES Master key: "CPM00000001.chr19.aes_key.bin"
   LUBA Encryption Index: "CPM00000001.chr19.lei.gz"
   Partially   encrypted    BAM:    "CPM00000001.
      chr19.part_enc.bam".
PrivET finished in 8 seconds.
data_owner$ll
-rw-rw-r-- 1 ayutov ayutov    244 May 15 12:32
CPM00000001.chr19.aes_key.bin
-rw-r--r-- 1 ayutov ayutov 523431006 May 14 13:38
CPM00000001.chr19.bam
-rw-r--r-- 1 ayutov ayutov    114096 May 14 15:46
CPM00000001.chr19.bam.bai
-rw-rw-r-- 1 ayutov ayutov    328 May 15 12:32
CPM00000001.chr19.lei.gz
-rw-rw-r-- 1 ayutov ayutov    168 May 15 12:32
CPM00000001.chr19.lei.gz.tbi
-rw-rw-r-- 1 ayutov ayutov 523431034 May 15 12:32
CPM00000001.chr19.part_enc.bam
-rw-rw-r-- 1 ayutov ayutov    114096 May 15 12:32
CPM00000001.chr19.part_enc.bam.bai
data_owner$ my CPM00000001.chr19.part_enc.bam*~/
   data_consumer
data_owner$ rm CPM00000001.chr19.bam*
```

Data Owner generates APOE keystream and "sends" it to Data Consumer:

```
data_owner$ privet -m keystream -l CPM00000001.
   chr19.lei.gz -r gene APOE -a CPM00000001.chr19.
   APOE.keystream.bin
Output:
   Keystream:
      "CPM00000001.chr19.APOE.keystream.bin"
PrivET finished in 0 seconds.
data_owner$ll
-rw-rw-r-- 1 ayutov ayutov    244 May 15 12:32
CPM00000001.chr19.aes_key.bin
-rw-rw-r-- 1 ayutov ayutov    163516 May 15 12:35
CPM00000001.chr19.APOE.keystream.bin
-rw-rw-r-- 1 ayutov ayutov    328 May 15 12:32
CPM00000001.chr19.lei.gz
-rw-rw-r-- 1 ayutov ayutov    168 May 15 12:32
CPM00000001.chr19.lei.gz.tbi
data_owner$                                     my
CPM00000001.chr19.APOE.keystream.bin~/data_con-
   sumer
```

Without the keystream, Data Consumer has access to all Genomic regions, except for the APOE gene. SAMTools and IGV will report errors, if asked to jump to the APOE region:

```
data_consumer$  samtools    view    CPM00000001.
chr19.part_enc.bam|less  NB501047:10:HLJGYBGXX:3:
21611:9816:6866    163    19    60046    0   101M=60086
141TTCTAACAGCAGAGCTGCCAGGCCAGGCCCTC-
AGGCAAGGGCTCTGAAGTCAGG    GTCACCTACTT
GCCAGGGCCGATCTTGGTGCCATCCAGG GGGC CT
CT  AAAAAEEEEEEEEEEEEEEEEEEEEEEEEEAEEEE
EEEEEEEAEEEEEEEEEEEEEAEE    EEEEEEEAAEEEE
EEEEEEEEEEEEEEEAEEEEEE<EE<EEA NM:i:0 MD:Z:
101    AS:i:101    XS:i:101   RG:Z:CPM00000001-B-D-3_
20180104 MQ:i:0 ms:i:3484 mc:i:60186 MC:Z:101M
data_consumer$    samtools   view    CPM00000001.
chr19.part_enc.bam 19:45409125
[main_samview] retrieval of region "19:45409125" failed
due to truncated file or corrupt BAM index file
```

Data Consumer decrypts the APOE region using the keystream received from Data Owner:

```
data_consumer$    privet    -m    view    -b
CPM00000001.chr19.part_enc.bam  -r exon APOE  -a
CPM00000001.chr19.APOE.keystream.bin
Output
   Decrypted    region(s)    BAM:   "CPM00000001.
      chr19.part_enc.dec.bam".
PrivET finished in 0 seconds.
data_consumer$ll
-rw-rw-r-- 1 ayutov ayutov 163516 May 15 12:35
CPM00000001.chr19.APOE.keystream.bin
-rw-rw-r-- 1 ayutov ayutov 523431034 May 15 12:32
CPM00000001.chr19.part_enc.bam
-rw-rw-r-- 1 ayutov ayutov    114096 May 15 12:32
CPM00000001.chr19.part_enc.bam.bai
-rw-rw-r-- 1 ayutov ayutov    102711 May 15 12:38
CPM00000001.chr19.part_enc.dec.bam
-rw-rw-r-- 1 ayutov ayutov    22944 May 15 12:38
CPM00000001.chr19.part_enc.dec.bam.bai
```

Now, Data Consumer can extract the decrypted APOE gene as well as other regions from the partially encrypted BAM file.

Extracting APOE and APOC1 Genes Exonic Regions:

```
data_consumer$ privet -m view -b CPM00000001.
chr19.part_enc.bam    -r    exon    APOE,APOC1    -a
CPM00000001.chr19.APOE.keystream.bin          -o
CPM00000001.chr19.APOE.APOC1.bam
Output
   Decrypted region(s) BAM: "CPM00000001.chr19.
      APOE.APOC1.bam".
```

Figure 7:
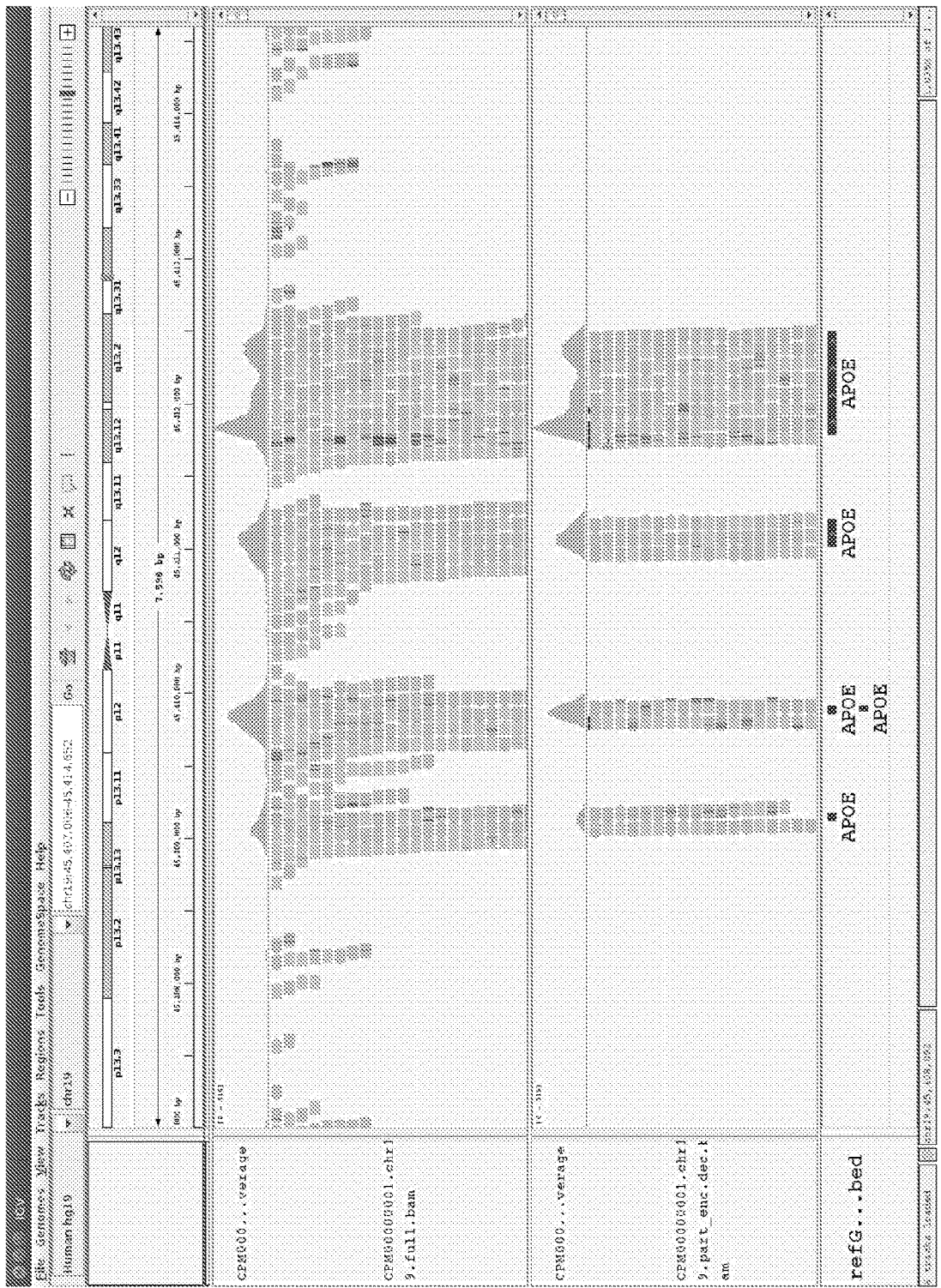
FIG. 7 shows sequence reads from the extracted full BAM file and the BAM file containing only the APOE exonic regions, as visualized via using the Integrated Genomic Viewer (IGV).

PrivET finished in 0 seconds.
Since Data Consumer has the keystream for the only encrypted region of the BAM, she can regenerate the full original BAM:
data_consumer$ privet -m view -b CPM00000001.chr19.part_enc.bam -a CPM00000001.chr19.APOE.keystream.bin -o CPM00000001.chr19.full.bam
PrivET finished in 8 seconds.
data_consumer$11
-rw-rw-r-- 1 ayutov ayutov 145320 May 15 12:39 CPM00000001.chr19.APOE.APOC1.bam
-rw-rw-r-- 1 ayutov ayutov 22976 May 15 12:39 CPM00000001.chr19.APOE.APOC1.bam.bai
-rw-rw-r-- 1 ayutov ayutov 163516 May 15 12:35 CPM00000001.chr19.APOE.keystream.bin
-rw-rw-r-- 1 ayutov ayutov 523431006 May 15 12:39 CPM00000001.chr19.full.bam
-rw-rw-r-- 1 ayutov ayutov 114096 May 15 12:39 CPM00000001.chr19.full.bam.bai
-rw-rw-r-- 1 ayutov ayutov 523431034 May 15 12:32 CPM00000001.chr19.part_enc.bam
-rw-rw-r-- 1 ayutov ayutov 114096 May 15 12:32 CPM00000001.chr19.part_enc.bam.bai
-rw-rw-r-- 1 ayutov ayutov 102711 May 15 12:38 CPM00000001.chr19.part_enc.dec.bam
-rw-rw-r-- 1 ayutov ayutov 22944 May 15 12:38 CPM00000001.chr19.part_enc.dec.bam.bai FIG. 7 shows sequence reads from the extracted full BAM file and the BAM file containing only the APOE exonic regions, as visualized via using the Integrated Genomic Viewer (IGV). It illustrates that only the sequencing reads from the APOE exonic regions are now made accessible or available, as desired.

Our algorithms and LUBA-PrivET tools provide the capability of fine-grained and privacy-preserving dynamic encryption and decryption of genomic sequencing data, which can be used by the data owner, data producers, data distributors and data consumers for a full range of genomic sequencing data transactions such that privacy can be properly preserved, related laws (e.g., GINA) can be followed and corresponding regulations (e.g., HIPAA) can be complied. As such, we anticipate potential commercial interests from all parties involved in genomic sequencing data (owner, producer, distributors, consumers, etc.).

Aim 1. Implement flexible attribute-based access control. We extend our LUBA-PrivET system with the support for flexible, fine-grained policies using the attribute-based encryption (ABE). In addition to the time-based constraint, we control access based on other attributes, such as type of data requestor (e.g., family member, clinical research coordinator, collaborating organization), country or location of the requestor, minimum age of the data owner at the time of data release, etc.

Specific Aim 2. Extend the system to track the data release and processing transactions using blockchain technology. With dynamic consent, proper audit is critically important in order to maintain privacy and transparency. For this purpose, we use blockchain technology to extend our LUBA-PrivET system with consistent and decentralized audit.

Specific Aim 3. Design and implement a secure and data utility preserving novel watermarking scheme for genomic data to deter and track unauthorized use of data. We cannot trust the data consumers to comply with the access control policies after the data is released, not to store and not to re-use the data after the expiration date/time, or not to distribute the data to unauthorized parties. To address this problem, we implement a novel secure watermarking scheme for secure genomic data sharing.

Overarching Hypothesis: Informatics and Cryptographic Technologies can Address Major Challenges with Sharing Genomic Data Specific Aim 1: Implement Flexible Attribute-Based Access Control.

Figure 8:
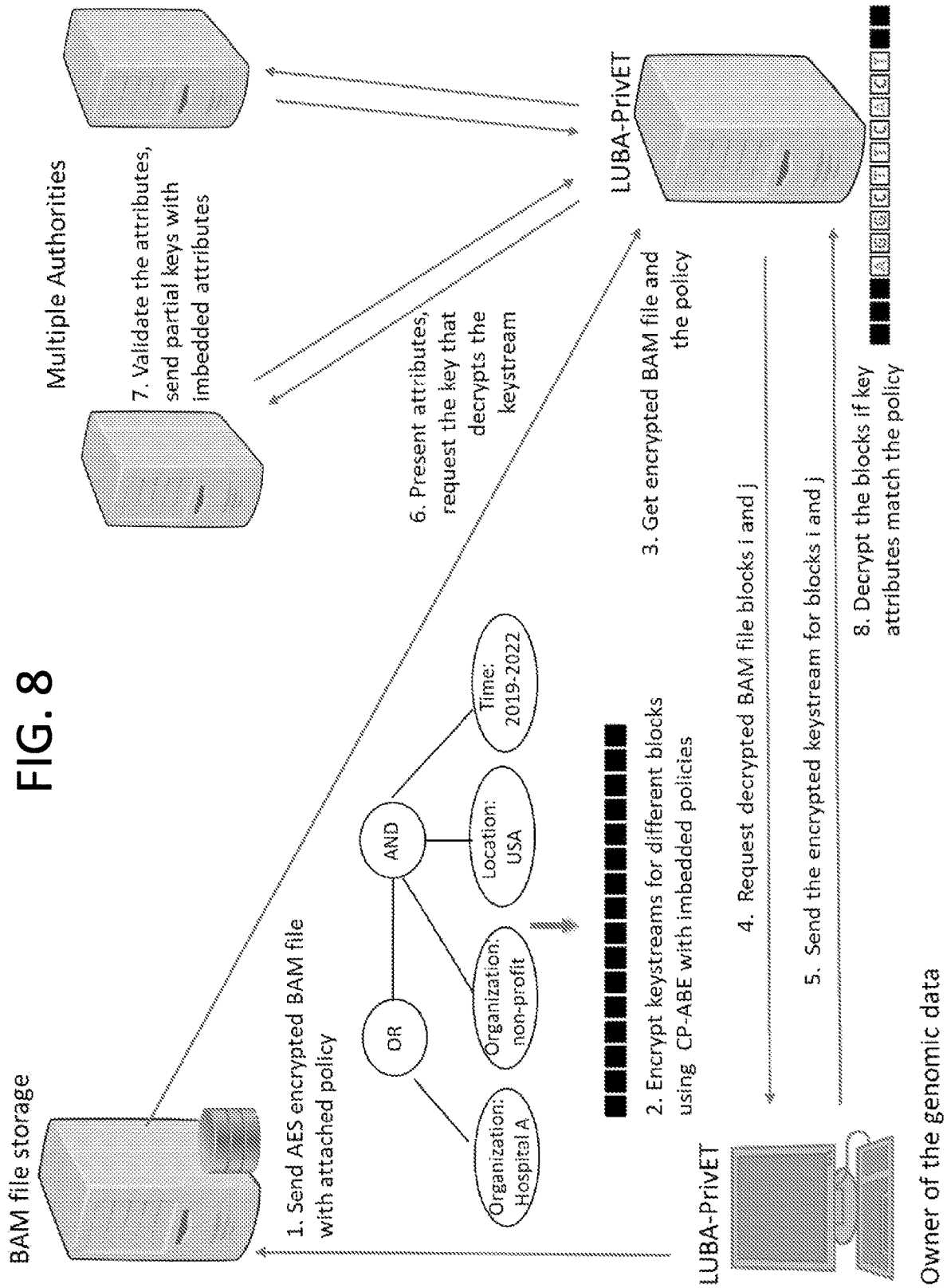
FIG. 8 shows an example system for implementing attribute-based encryption (ABE).

Rationale: The disclosure also provides for even finer-grained or more granular data access control: implementing controls over what, when, where and to what extent a participant's genomic data can be shared. Only with these refined levels of controls, can the dynamic consent be truly implemented, all three pillars of informed consent be truly enforced, or the ownership-based governance be truly enabled. To address this feature, we may implement attribute-based encryption (ABE). An example system for implementing ABE is shown in FIG. 8.

Experimental Design and Methods

Attribute-Based Encryption (ABE) is a next-generation type of public key encryption that supports fine-grained access control policies that are cryptographically enforced.

Data objects are encrypted using a set of attributes typically expressed as logical combinations referencing attributes of the requester, environment, or the data object. We therefore extend our LUBA-PrivET system with the support for flexible, fine-grained policies using the Ciphertext Policy (CP) ABE encryption. In CP-ABE system, attributes are associated with users and policies are bound with each ciphertext. A user can decrypt a ciphertext if and only if her attributes satisfy the policy.

We control the access to genomic data based on how it will be used. For example, clinical, research and commercial use cases will be differentiated. The data owner will have a choice to release sensitive genomic information to a treatment provider, while keeping it private from other organizations.

Additionally, we may support attributes that allow one to seek consent for more narrowly defined research uses of participant's data. For example, use of the data can limited to:
  health/medical/biomedical purposes; does not include the study of population origins or ancestry
  a specified disease
  not-for-profit purposes or by non-commercial entities Time-based attributes may be implemented as well. A specific time period, during which the keystream can be decrypted, may be defined in the policy. This allows us to impose different time constraints on various genomic regions. For example, certain genes can only be decrypted within a short period of time after the release of the keystream, while other genes will become available after a particular date.

In addition to the usage and time-based constraints, we may control access based on other attributes, such as type of the data requestor (e.g., relative, member of a particular organization), country or location of the requestor, minimum age of the data owner at the time of data release, etc.

Payment can be added to the set of attributes as well, to allow the participants to benefit from sharing their genomic data.

The ABE may be an extra layer on top of our existing implementation of the encryption schema. In particular, additional flexible controls enabled by CP-ABE protect the keystream that the owner of the genomic data can choose to share to decrypt specific genomic regions of the encrypted BAM file. A different policy can be attached to each keystream.

The attribute-based policies may be embedded in the encrypted data objects (ciphertext), thus making it impossible to remove or modify the policies. The data requestor will need to proof the possession of the requestor-related attributes, in order to decrypt the ciphertext. Other types of attributes may also be checked before enabling the object decryption.

To avoid reliance on a single trusted party to release the corresponding decryption keys, we may adopt a multi-authority scheme based on the threshold secret sharing cryptographic constructions. The key that decrypts the sensitive ciphertext can be distributed over several parties then reconstructed when needed.

For example, the key can be split into N partial keys. The partial keys may be securely distributed to N authorities. To decrypt the keystream, M out of N (M≤N) parties
collaborate to combine their parts to construct the key that will decrypt the keystream. There are cryptographic constructions that support such distributed threshold secret sharing.

We may use OpenABE library for our implementation. OpenABE is a C/C++ software library that implements several attribute-based encryption schemes. It provides an efficient implementation that embeds security guarantees at the architectural level. OpenABE incorporates best practices in encryption scheme design which includes security against chosen ciphertext attacks, a simple interface for transporting symmetric keys, and support for performing encryption of large data objects.

The LUBA-PrivET system may be implemented in a highly modular manner. The ABE module can be added or dropped.

Specific Aim 2: Extend the system with the blockchain technology to track the data release and processing transactions.

Rationale: With dynamic consent, proper audit is critically important in order to maintain privacy and transparency. The current dynamic consent systems typically support data retrieval from a single portal with no multi-party validation. Such centralized environment becomes a single point of failure and an attractive target for malicious attacks. Additionally, such centralized untraceable data management prevents a high level of transparency, limiting the trust relationship between the data owner, the data repository, and data consumer. Blockchain is a distributed (spread across a network of computers) public ledger that can record and store transactions in an unalterable and verifiable way. The blockchain technology allows sensitive information to be exchanged and modified in a verifiable and traceable manner. When a related data item on the blockchain is added or altered, the appropriate parties (e.g., data owner, data storage facility) will be notified of the change and the validation of the transaction could be requested. We may extend our LUBA-PrivET system with the blockchain technology to implement consistent decentralized audit.

Experimental Design and Methods:

For the proper audit purpose, the blockchain technology may be added to our proposed LUBA-PrivET system to audit data release and usage processes. Events that can be recorded on the blockchain include but are not limited to 1) posting a BAM file with associated policies (time, entity who posted it, the policies, etc.); 2) release of encrypted BAM file (time, entity that released the file, entity who received the file, etc.); 3) sending of the encrypted keystream (time, entity who sent it, entity who received it, the blocks that will be decrypted using the keystreams, etc.); 4) validation of the relevant attributes (time, entity which validated the attributes, entity which presented the attributes, the values of the attributes, etc.; 5) the distribution of the partial keys that are needed to decrypt the keystream (entities that received the partial keys, timestamp, etc.); 6) release of the partial keys by collaborating entities to construct the key that decrypts the keystream (time, parties that released the partial keys, entity that received the partial keys, etc.); 7) usage of the decrypted data (entity that processed the decrypted data, time, etc.).

We may extend the LUBA-PrivET system with the blockchain technology to track the data release and processing transactions. We may use Hyperledger Fabric for our implementation in one example.

Hyperledger is an open-source permissioned blockchain initiative under IBM and the Linux Foundation. Permissioned blockchain restricts who is allowed to participate in the network, and what transactions can be created and queried.

Hyperledger Fabric is a blockchain implementation within this project. It is a modular and customizable blockchain system for developing distributed blockchain applications. It employs a customizable consensus, smart contracts (called chaincode), and transaction validation. Transactions may remain private, but participants cannot be anonymous.

The shared ledger records the state of the audit log. The ledger stores collections of transactions as blocks. In addition to transaction records, each block contains a timestamp of when that block was created as well as the cryptographic hash of the data contained in the previous block.

The timestamped hash-chaining functionality of the blockchain ledger, combined with data replication on nodes across the network, ensure that attackers cannot modify audit log data once it has been committed to the ledger. Cryptographic identities maintained on the permissioned blockchain network link each transaction to the user who owns that cryptographic identity, maintaining user accountability.

The main Fabric components:

Membership Service Provider (or Certificate Authority) -provides cryptographic identity management: issues and validates digital certificates, authenticates users. It handles new user registration and enrollment, allowing new end users to register on the network at each participant organization.

Orderer (or ordering service) provides a shared communication channel to client applications and peers, offering a broadcast service for messages containing transactions. The communicated messages are the candidate transactions for inclusion in the ledger state.

Peer receives ordered ledger state updates in the form of blocks from the orderer and maintains the state of the ledger. Peers store the full ledger. Peers can store some data in a private database (e.g., audit records which contain sensitive information), which can be accessed from chaincode on these authorized peers. The ordering service does not see the private data. A hash of that data is endorsed, ordered, and written to the ledgers of every peer. The hash serves as an evidence of the transaction and is used for state validation and can be used for audit purposes.

Peers can additionally take up a role of an endorser. Endorsement protocol in Fabric species the number and type of peers that need to provide signatures on a transaction to be validated later in the process.

Organization logically separates members (peers) from each other, and may or may not share the Certificate Authority.

Each participant organization owns a peer node and a Certificate Authority. All nodes share an ordering service. Each peer node holds a full copy of the ledger containing the audit log data.

The disclosure further includes customizing the following Fabric components:

Transactions which will consist of audit log data.

Queries which will consist of parameters specifying the properties of audit log data being requested by the end user.

Users can query the audit ledger to monitor usage of their genomic data.

Audit companies can query the leger to monitor usage of a set of users.

Chaincode which will implement our audit- and access control-related logic.

Figure 9:
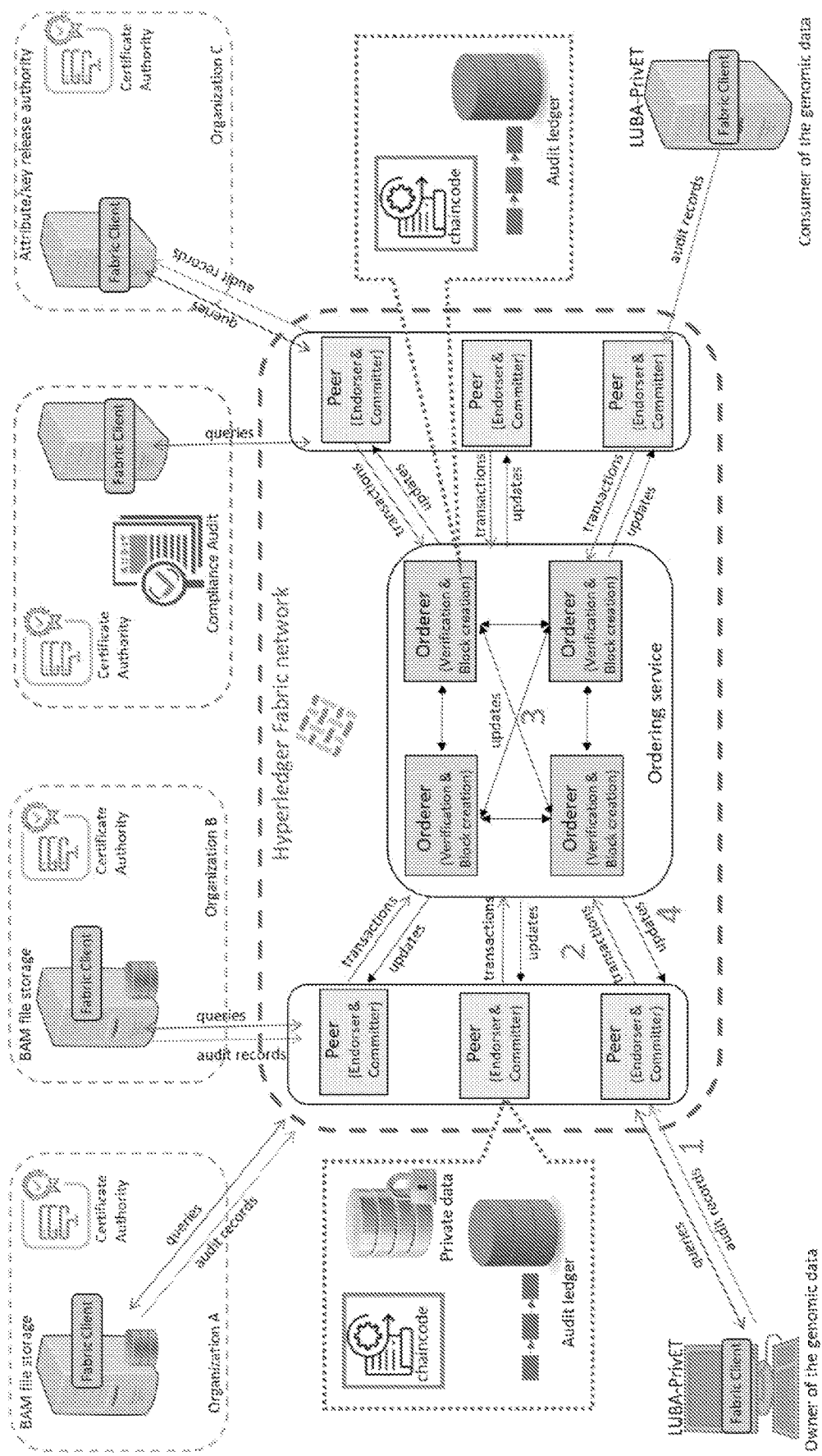
FIG. 9 shows an outline of a proposed deployment model.

FIG. 9 outlines our proposed deployment model, some arrows and components are omitted for simplicity.

The audit ledger update process involves four steps:

1. The Fabric client (Client SDK for Node.js.) connects to a Hyperledger Fabric network, creates an audit transaction and sends it to the endorsing peer.
2. The endorsing peer verifies the client's signature. If the check succeeds, the transaction is endorsed and submitted to the ordering service, which manages the block creation. Otherwise, the transaction is cancelled.
3. The ordering service ensures that the signatures of endorsing peers are valid, creates a new block and broadcasts it to all peers on the network.
4. All ordering peers validate the new block. They check the endorsement policy to ensure that the correct allotment of the specified peers have signed the results, and they authenticate the signatures against the transaction payload. All peers commit and apply the same sequence of transactions and update their state.

A custom chaincode may be developed using Go (the general-purpose programming language supported by Fabric) to manage audit log creation, query, and detection of unauthorized access. The custom chaincode may be deployed on the Fabric network.

Chaincode handling the creation and retrieval of audit log data (deployed on endorsing peers) may impose a standard structure, achieving interoperability for participating provider organizations.

Audit data generated by various applications may be stored on a single blockchain, simplifying and streamlining audit log reporting and analysis.

Automated analysis of audit logs (deployed on ordering and endorsement peers) may allow automatic timely detection of malicious behavior in the system. Examples of events that can be detected:

a decrypted BAM file was processed after the expiration date a decrypted BAM file was processed, but there is no audit record about keystream release by the data owner or partial key release by the attribute validation authorities a BAM file was sent to a client, but there is no audit record of data owner sending the file to the storage facility Peers run custom audit log chaincode that formats audit log data, returns audit log data to clients in response to queries, adds new audit log entries to the ledger, and detects suspicious and unauthorized activity.

Specific Aim 3: Design and Implement a Secure and Data Utility Preserving Novel Watermarking Scheme for Genomic Data to Deter and Track Unauthorized Use of Data.

Rationale: We cannot trust the data consumers to comply with the access control policies after the data is released. In particular, after the data is decrypted, it can be stored and used again after the expiration date/time. The data can also be distributed to unauthorized parties. To address this problem, a novel secure watermarking scheme for genomic data sharing may be implemented in accordance with the present disclosure. The challenge is to develop a scheme that:

(1) is resilient to watermark detection and modification: the data consumer should not be able to determine, change or remove the watermarked data items;

(2) minimizes data loss due to embedded watermark and preserves the utility of the data.

The watermark may uniquely identify a particular data file. An audit record about every use of the decrypted data may be posted on the blockchain. Since the watermark cannot be removed from the data, the system may be able to automatically track and validate the transactions. For example, the system can compare the identities of the entities that were authorized to access a particular watermarked data, as well as check the time-based data use constrains. The system may alert the corresponding parties, if it finds inconsistencies.

Experimental Design and Methods:

A watermark may be embedded in a BAM file or a VCF file that allows for the tracking of incidents of sharing or re-using of the file in violation of the policy.

The watermark added to a BAM or a VCF file may be configured so as to not affect the subsequent analysis. One approach is to modify the low quality data. A watermark pattern can be inserted into low quality BAM reads, which may be filtered out, for example, by a variant caller. Rather than attaching the watermark to specific data points (genomic positions), we can bind the pattern to positions within a read. To make watermark difficult to detect and modify, it can be inserted at different offsets from the beginning of the reads. This can be achieved by utilizing a keyed hash function to map read names to an array of the typical read length (e.g., 100 bp). The hashed value will then be the starting position of the watermark. To test the utility of the watermarked data, we may process it with the bcbio bioinformatics pipeline, which detects germline or somatic variants from NGS data using multiple most popular variant callers, and validate the results with the non-watermarked data.

Shared genomic data can be fully or partially encrypted by LUBA-PrivET. Prior to using the encrypted data, the data consumer may run LUBA-PrivET to decrypt the data using the key stream provided by the data owner, as well as to extract the unencrypted portion of the data. While other bioinformatics tools (SAMTools, BCFTools) may be able to extract some unencrypted data, they will report errors when approaching the encrypted regions.

Unencrypted original genomic data may be watermarked before sharing. If the data is sent to multiple data storages, a different watermark may be assigned in each data file. Thereby, the shared encrypted or partially decrypted data can be always traced to the responsible organization.

The record of the watermarking procedure may be stored on the blockchain. Every time the owner of the data releases a keystream to decrypt a portion of the data, the record of this event is stored on the blockchain as well. By monitoring the blockchain transactions, the system can automatically detect potential violations of corresponding policies (e.g., key stream is used past the expiration date, the key stream is shared with another organization, etc.).

To summarize, by watermarking the genomic data, each organization that stores the data can be held accountable for sharing the data and for violating the data access control policies. Together, we have developed a comprehensive informatics systems and tools to address existing technical, legal and ethical hurdles associated with sharing genomic data effectively, securely, and transparently.

| Timeline | |
| --- | --- |
| Year 1 | Aim 1: Implement ABE-based access control<br>Aim 2: Extend the system with blockchain technology to track the transactions. |
| Year 2 | Aim 2: Extend the system with blockchain technology to track the transactions.<br>Aim 3: Design and implement a secure and data utility preserving watermarking scheme for genomic data. |

Impact: In this application, we implement an innovative suite of informatics tools and algorithms that will greatly facilitate sharing genomic data, with a plethora of desirable features and features combinations. Once fully implemented, the disclosed systems and methods may greatly and positively impact sharing genomic data in the community.

Once fully implemented, we believe that LUBA-PrivET should greatly empower participant-centric decision making and facilitate large scale data sharing used for cancer genomic research. On the commercial side, large sequencing facilities or companies may use it to ensure privacy compliance or to provide privacy-ensuring data encryption services. Cloud vendors like AWS and Google may use it for offering genomic data storage and management services, potentially creating a genomic data marketplace. Data consumers such as researchers will be able to use the disclosed systems and methods to quickly locate a large number of genomic data sets that meet the specified consent requirements.

Example Embodiments

A first example embodiment includes a method of dynamically encrypting a file formed of multiple blocks of ordered data to enable partial decryption of the file, the method comprising generating, using a secret key and one or more initialization vectors associated with the file, a keystream for the multiple blocks of ordered data of the file, encrypting the multiple blocks of ordered data of the file by performing a logical operation of the keystream with the multiple blocks of ordered data in a one-to-one correspondence, and building a file index of the file to identify location information of the multiple blocks of ordered data.

A second example embodiment includes the first example embodiment, and further includes the method wherein the keystream is formed of a plurality of blocks, each block of the keystream corresponding to an associated block of the file.

A third example embodiment includes the first and/or second example embodiment, and further includes the method wherein each block of the keystream has a value that is a function of the secret key, the initialization vectors, and an offset of the respective associated block of the file from a beginning of the file, and wherein each block of the keystream has a length that is equal to a length of the respective associated block of the file, wherein the initialization vectors include a value that is combined with the secret key to generate the keystream.

A fourth example embodiment includes one or more of the first through third example embodiments, and further includes the method wherein building the index of the file comprises, for each block of the file: reading the block from the file, wherein the ordered data of the block includes one or more data groupings, identifying start and end positions for each data grouping of the block and saving the start and end positions with an associated read offset from a start of the block, updating a block encryption index for the block, the block encryption index identifying the start and end positions of the data groupings for the block, and updating the file index for the file using the saved start and end positions and the associated read offsets identified in the block encryption index, the file index storing the information from the block encryption index for each block of the file.

A fifth example embodiment includes one or more of the first through fourth example embodiments, and further includes the method wherein the data groupings include sorted genomic data.

A sixth example embodiment includes one or more of the first through fifth example embodiments, and further includes the method wherein the sorted genomic data is sorted by chromosome position.

A seventh example embodiment includes one or more of the first through sixth example embodiments, and further includes the method wherein each of the associated read offsets comprises a respective number of bits or a respective number of bytes indicating a distance from a beginning of the file.

An eighth example embodiment includes one or more of the first through seventh example embodiments, and further includes the method wherein the secret key and/or the keystream is generated using a stream cipher or a block cipher in a counter mode of operation.

A ninth example embodiment includes one or more of the first through eighth example embodiments, and further includes the method wherein the stream cipher includes Salsa 20 and wherein the block cipher in the counter mode of operation includes Advanced Encryption Standard, Counter mode (AES-CTR).

A tenth example embodiment includes one or more of the first through ninth example embodiments, and further includes the method wherein the file is an ordered genomic data file. An eleventh example embodiment includes one or more of the first through tenth example embodiments, and further includes the method wherein the ordered genomic data file is in a Blocked GNU Zip Format (BGZF).

A twelfth example embodiment includes one or more of the first through eleventh example embodiments, and further includes the method wherein the ordered genomic data file is a Binary Alignment Map (BAM) file storing genomic sequences or a Variant Call Format (VCF) file storing genomic variation.

A thirteenth example embodiment includes one or more of the first through twelfth example embodiments, and further includes the method wherein the logical operation includes an XOR or an XNOR operation.

A fourteenth example embodiment includes one or more of the first through thirteenth example embodiments, and further includes the method wherein the secret key is a random number that is not shared during decryption of the file.

A fifteenth example embodiment includes one or more of the first through fourteenth example embodiments, and further includes the method wherein dynamically encrypting the file includes encrypting only a portion of the file, encrypting different portions of the file at different times, encrypting only a portion of a block of the file, and/or re-encrypting at least a portion of the file after performing a prior encryption of the file.

A sixteenth example embodiment includes one or more of the first through fifteenth example embodiments, and further comprises embedding policy information in the encrypted blocks of data, the policy information defining, for each data grouping of each block of the file, rules for decrypting the data grouping.

A seventeenth example embodiment includes one or more of the first through sixteenth example embodiments, and further includes the method wherein the rules include time-based rules that define a time or time duration in which the data grouping is allowed to be decrypted, requesting party rules that define entities and/or users that are allowed to decrypt the data grouping, and/or usage rules that define one or more usages for which the data grouping is allowed to be decrypted.

An eighteenth example embodiment includes one or more of the first through seventeenth example embodiments, and further comprises revising one or more of the rules for decrypting the data grouping responsive to receiving an associated request from an owner of the ordered data stored in the file.

A nineteenth example embodiment includes one or more of the first through eighteenth example embodiments, and further includes the method wherein revising one or more of the rules includes rescinding access to one or more portions of the keystream and/or rescinding, after at least a portion of the file is decrypted, access to decrypted data of the file.

A twentieth example embodiment includes one or more of the first through nineteenth example embodiments, and further includes the method wherein encrypting the multiple blocks of ordered data generates multiple blocks of encrypted data corresponding to the file, the method further comprising dynamically decrypting at least a portion of the file.

A twenty-first example embodiment includes one or more of the first through twentieth example embodiments, and further includes the method wherein dynamically decrypting at least the portion of the file includes decrypting at least one selected block of encrypted data of the file using a portion of the keystream, the portion of the keystream corresponding to the at least one selected block.

A twenty-second example embodiment includes one or more of the first through twenty-first example embodiments, and further includes the method wherein the at least one selected block of encrypted data comprises only a subset of the multiple blocks of encrypted data of the file.

A twenty-third example embodiment includes one or more of the first through twenty-second example embodiments, and further includes the method wherein decrypting the at least one selected block includes performing a logical operation of the portion of the keystream with the encrypted data of the at least one selected block to generate plaintext data corresponding only to the at least one selected block.

A twenty-fourth example embodiment includes a method of dynamically decrypting at least a portion of a file formed of multiple blocks of encrypted data, the method comprising receiving a request to decrypt at least one selected block of encrypted data of the file, responsive to validating the request, retrieving a portion of a keystream for the file, the portion of the keystream corresponding to the at least one selected block, and decrypting the at least one selected block by performing a logical operation of the portion of the keystream with the encrypted data of the at least one selected block to generate plaintext data corresponding only to the at least one selected block.

A twenty-fifth example embodiment includes the twenty-fourth example embodiment, and further comprises validating the request by comparing attributes of the request and a user making the request with one or more attributes associated with the user and/or policies bound with the encrypted data to determine if the user and the request are in compliance with the attributes and policies, respectively.

A twenty-sixth example embodiment includes the twenty-fourth and/or twenty-fifth example embodiment, and further includes the method wherein dynamically decrypting the file comprises decrypting selected portions of the file using the keystream while remaining portions of the file are not decryptable.

A twenty-seventh example embodiment includes one or more of the twenty-fourth through twenty-sixth example embodiments, and further includes the method wherein selected portions of the file are decryptable using the portion of the keystream while remaining portions of the file are not decryptable.

A twenty-eighth example embodiment includes one or more of the twenty-fourth through twenty-seventh example embodiments, and further includes the method wherein the encrypted data of the file is generated using a secret key, the secret key being used to generate the keystream, different portions of which are subsequently used for decrypting only respective portions of the file in respective decryption iterations without sharing the secret key.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of dynamically encrypting a file formed of multiple blocks of ordered data to enable partial decryption of the file, the method comprising:
   generating, using a secret key and one or more initialization vectors associated with the file, a keystream for the multiple blocks of ordered data of the file, wherein different portions of the keystream are subsequently used for decrypting respective portions of the file in respective decryption iterations without sharing the secret key;
   encrypting the multiple blocks of ordered data of the file by performing a logical operation of the keystream with the multiple blocks of ordered data in a one-to-one correspondence, wherein the file is an ordered genomic data file, and wherein the ordered genomic data file is in a Blocked GNU Zip Format (BGZF), Binary Alignment Map (BAM) file storing genomic sequences, or a Variant Call Format (VCF) file storing genomic variation; and
   simultaneously building a file index of the file as each block of the multiple blocks of ordered data of the file is encrypted, to identify location information of the multiple blocks of ordered data,
   wherein the building of the file index of the file comprises writing values for each block including one or more of a leftmost position of a data grouping present in a respective block, a rightmost position of a data grouping present in the respective block, an offset of the respective block, or a length of the respective block to a file index file.

2. The method of claim 1, wherein the keystream is formed of a plurality of blocks, each block of the keystream corresponding to an associated block of the file, and wherein each block of the keystream has a value that is a function of the secret key, the initialization vectors, and an offset of the respective associated block of the file from a beginning of the file, and wherein each block of the keystream has a length that is equal to a length of the respective associated block of the file, wherein the initialization vectors include a value that is combined with the secret key to generate the keystream.

3. The method of claim 1, wherein building the index of the file comprises, for each block of the file as the block of the file is encrypted:
   reading the block from the file, wherein the ordered data of the block includes one or more data groupings;
   identifying start and end positions for each data grouping of the block and saving the start and end positions with an associated read offset from a start of the block;
   updating a block encryption index for the block, the block encryption index identifying the start and end positions of the data groupings for the block; and
   updating the file index file for the file using the saved start and end positions and the associated read offsets identified in the block encryption index, the file index file storing the information from the block encryption index for each block of the file.

4. The method of claim 3, wherein the data groupings include sorted genomic data.

5. The method of claim 4, wherein the sorted genomic data is sorted by chromosome position.

6. The method of claim 3, wherein each of the associated read offsets comprises a respective number of bits or a respective number of bytes indicating a distance from a beginning of the file.

7. The method of claim 1, wherein the secret key and/or the keystream is generated using a stream cipher or a block cipher in a counter mode of operation.

8. The method of claim 1, wherein the logical operation includes an XOR or an XNOR operation.

9. The method of claim 1, wherein the secret key is a random number, and wherein dynamically encrypting the file includes encrypting only a portion of the file, encrypting different portions of the file at different times, encrypting only a portion of a block of the file, and/or re-encrypting at least a portion of the file after performing a prior encryption of the file.

10. The method of claim 1, further comprising embedding information in the encrypted blocks of data, the policy information defining, for each data grouping of each block of the file, rules for decrypting the data grouping, and wherein the rules include time-based rules that define a time or time duration in which the data grouping is allowed to be decrypted, requesting party rules that define entities and/or users that are allowed to decrypt the data grouping, and/or usage rules that define one or more usages for which the data grouping is allowed to be decrypted.

11. The method of claim 10, further comprising revising one or more of the rules for decrypting the data grouping responsive to receiving an associated request from an owner of the ordered data stored in the file.

12. The method of claim 11, wherein revising one or more of the rules includes rescinding access to one or more portions of the keystream and/or rescinding, after at least a portion of the file is decrypted, access to decrypted data of the file.

13. The method of claim 1, wherein encrypting the multiple blocks of ordered data generates multiple blocks of encrypted data corresponding to the file, the method further comprising dynamically decrypting at least a portion of the file, wherein dynamically decrypting at least the portion of the file includes decrypting at least one selected block of encrypted data of the file using a portion of the keystream, the portion of the keystream corresponding to the at least one selected block.

14. The method of claim 13, wherein the at least one selected block of encrypted data comprises only a subset of the multiple blocks of encrypted data of the file, and wherein decrypting the at least one selected block includes performing a logical operation of the portion of the keystream with the encrypted data of the at least one selected block to generate plaintext data corresponding only to the at least one selected block.

15. A system for dynamically decrypting at least a portion of a file formed of multiple blocks of encrypted data, the system comprising:
   a processor; and memory storing instructions executable by the processor to:
   receive a request to decrypt at least one selected block of encrypted data of the file, wherein the file is an ordered genomic data file, wherein the encrypted data of the file includes ciphertext that is generated by a data owner of the file using a secret key, and wherein one or more attribute-based policies defining rules are embedded into the ciphertext, and wherein the rules include time-based rules that define a time or time duration in which a data grouping is allowed to be decrypted, requesting party rules that define entities and/or users that are allowed to decrypt the data grouping, and usage rules that define one or more usages for which the data grouping is allowed to be decrypted;

responsive to validating the request, retrieve a portion of a keystream for the file, the portion of the keystream corresponding to the at least one selected block, wherein the keystream is received from the data owner, and responsive to determining that the attribute-based policies are satisfied, decrypt the at least one selected block by performing a logical operation of the portion of the keystream with the encrypted data of the at least one selected block to generate plaintext data corresponding only to the at least one selected block.

16. The system of claim 15, wherein the instructions are further executable to validate the request by comparing attributes of the request and a user making the request with one or more attributes associated with the user and/or policies bound with the encrypted data to determine if the user and the request are in compliance with the attributes and policies, respectively.

17. The system of claim 15, wherein dynamically decrypting the file comprises decrypting selected portions of the file using the keystream while remaining portions of the file are not decryptable.

18. The system of claim 15, wherein selected portions of the file are decryptable using the portion of the keystream while remaining portions of the file are not decryptable.

19. The system of claim 15, wherein the secret key is used to generate the keystream, different portions of which are subsequently used for decrypting only respective portions of the file in respective decryption iterations without sharing the secret key.

* * * * *

SEQUENCE LISTING

```
<160> NUMBER OF SEQ ID NOS: 1

<210> SEQ ID NO 1
<211> LENGTH: 28
<212> TYPE: DNA
<213> ORGANISM: Artificial Sequence
<220> FEATURE:
<223> OTHER INFORMATION: Synthetic sequence

<400> SEQUENCE: 1
ttacgctaca ggcttcactg tgacagca                                28
```